(12) United States Patent
Yoshitake et al.

(10) Patent No.: US 7,730,752 B2
(45) Date of Patent: Jun. 8, 2010

(54) THEFT PREVENTION APPARATUS FOR LEISURE VEHICLE

(75) Inventors: Hideto Yoshitake, Akashi (JP); Tomoyuki Takahashi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 510 days.

(21) Appl. No.: 11/717,614

(22) Filed: Mar. 12, 2007

(65) Prior Publication Data

US 2007/0214849 A1 Sep. 20, 2007

(30) Foreign Application Priority Data

Mar. 13, 2006 (JP) .............................. 2006-067944

(51) Int. Cl.
*B60R 25/02* (2006.01)
(52) U.S. Cl. .......................... 70/252; 70/186; 70/278.3; 307/10.3; 340/5.64
(58) Field of Classification Search ................ 70/278.3, 70/389, 252, 182–186, 237, 409; 307/10.1–10.3; 340/5.64, 5.2
See application file for complete search history.

(56) References Cited

U.S. PATENT DOCUMENTS

| | | | | |
|---|---|---|---|---|
| 5,656,867 | A * | 8/1997 | Kokubu .................... 307/10.5 |
| 6,125,671 | A * | 10/2000 | Suzuki ........................ 70/186 |
| 6,260,651 | B1 * | 7/2001 | Kokubu et al. .............. 180/287 |
| 6,389,856 | B1 * | 5/2002 | Watanuki et al. ............ 70/186 |
| 6,412,321 | B1 * | 7/2002 | Aramburu et al. .......... 70/278.3 |
| 6,442,985 | B1 * | 9/2002 | Watanuki et al. ............ 70/186 |
| 6,539,762 | B1 * | 4/2003 | Wittwer ..................... 70/423 |
| 6,776,016 | B1 * | 8/2004 | Wittwer et al. ............... 70/252 |
| 6,941,779 | B2 * | 9/2005 | Shigeyama et al. .......... 70/186 |
| 6,986,272 | B2 * | 1/2006 | Sandvoss et al. ............. 70/409 |
| 7,055,351 | B2 * | 6/2006 | Suzuki et al. ................ 70/186 |
| 7,071,819 | B2 * | 7/2006 | Konno et al. ................ 340/427 |
| 7,299,669 | B1 * | 11/2007 | Chung et al. ................. 70/252 |
| 7,363,787 | B2 * | 4/2008 | Yukihara et al. ............. 70/252 |
| 7,591,158 | B2 * | 9/2009 | Konno et al. ................. 70/252 |
| 2003/0115917 | A1 * | 6/2003 | Rudolph et al. .............. 70/252 |
| 2004/0003632 | A1 * | 1/2004 | Ohtaki et al. ................ 70/252 |
| 2005/0235712 | A1 * | 10/2005 | Yukihara et al. ............. 70/252 |
| 2006/0027003 | A1 * | 2/2006 | Mizukura ................... 70/252 |
| 2007/0247280 | A1 * | 10/2007 | Nakamura ................. 340/5.72 |
| 2009/0266122 | A1 * | 10/2009 | Okada et al. ................ 70/252 |

FOREIGN PATENT DOCUMENTS

JP 2006-199168 8/2006

\* cited by examiner

*Primary Examiner*—Suzanne D Barrett
(74) *Attorney, Agent, or Firm*—Alleman Hall McCoy Russell & Tuttle LLP

(57) ABSTRACT

A theft prevention apparatus for a leisure vehicle including a portable device, a lock device, a lock operation stopper member, a pull-out operation stopper member, a lock operation restricting actuator, a pull-out operation restricting actuator, and a controller including a memory, a receiver, and a processing unit configured to control the lock operation restricting actuator to cause a lock operation stopper member to be moved from the position where a protruded operation and a retracted operation of a lock bar are disabled to the position where the protruded operation and the retracted operation are enabled and to control the pull-out operation restricting actuator to cause a pull-out operation stopper member to be moved from the position where a pull-out operation of the mechanical key is disabled to the position where the pull-out operation of the mechanical key is enabled, when the user identification codes match.

14 Claims, 13 Drawing Sheets

THEFT PREVENTION APPARATUS FOR LEISURE VEHICLE

TECHNICAL FIELD

The present invention relates to a theft prevention apparatus suitable for use with leisure vehicles such as motorbikes, motorcycles, or three-wheeled motor vehicles, three-wheeled or four-wheeled utility vehicles, caterpillar utility vehicles, and personal watercraft (PWC) which are equipped with rider's or driver's seats which are open to the outside.

BACKGROUND OF THE INVENTION

Typically, a leisure vehicle, for example a motorcycle, is equipped with a rider's seat which is open to the outside. Thus, anyone may freely mount the rider's seat. A mechanical key is inserted into a key hole to turn on or off a main switch of the vehicle and is positioned in an exposed region near the rider's seat, for example, an instrument panel located in front of the rider's seat. As used herein, the term "mechanical key" refers to a key that has a specified concave-convex shape in a teeth portion to enable mechanical unlocking and does not have a function of transmitting a user identification (ID) code and the like.

For the above reason, the motorcycle is more likely to be stolen in contrast to four-wheeled motor vehicles such as automobiles or trucks, which are equipped with drivers' seats isolated from outside in which a third party is unable to access.

Under the circumstances, a theft prevention apparatus equipped in the vehicle is disclosed, in which the mechanical key inserted into the key switch is operated to turn on the main switch equipped in the vehicle only when the theft prevention apparatus receives, from a portable device (card-type portable device) being carried by a user such as a rider, a user ID code that matches a user ID code stored in a memory built into the vehicle, and in this state, the rider can start-up an engine.

In the leisure vehicle such as the motorcycle, since the rider's seat is open to the outside as described above, the rider in many cases steers the motorcycle, wearing gloves while driving. To start the vehicle, the rider takes the gloves off to take the mechanical key out of the pocket or the like, inserts the mechanical key into the key hole, and rotates the key to a predetermined position. Thereafter, the rider puts back on the gloves. Such a procedure may be burdensome to the rider.

To address these circumstances, a new electronic theft prevention system is proposed which is not equipped with the key switch using the mechanical key (see Japanese Patent Application No. 2005-013581). The electronic theft prevention system includes a portable device configured to transmit a user ID code and an in-vehicle theft prevention apparatus that is configured to receive the user ID code transmitted from the portable device, determine whether or not the received user ID code matches a user ID code stored in a memory built into the vehicle, and turn on an electric circuit when it is determined that these two user ID codes match, thereby starting the vehicle. In this electronic theft prevention system, only a person carrying a specified portable device is able to steer the motorcycle without the use of the mechanical key. In addition, a main switch is fixedly mounted to the vehicle instead of the key switch and is rotated or pressed down to turn on and off the main switch or the like mounted to the vehicle. This electronic theft prevention system has advantages that the rider need not take the mechanical key out of a pocket or the like and insert it into the key hole every time the rider steers the vehicle. So, the rider need not take off gloves to take the mechanical key out of the pocket or the like.

However, in the leisure vehicle equipped with the above mentioned electronic theft prevention system, the rider needs to take the mechanical key out of the pocket or the like and unlock a lock device provided to a tank cap (also referred to as a fuel cap) to refill a fuel. The rider also needs to take the mechanical key out of the pocket or the like to lock or unlock a helmet holder or an article container. So, the rider needs to carry the mechanical key in the pocket or the like, but may in some cases forget to put the mechanical key in the pocket or the like because the mechanical key is not used to operate the main switch. In those cases, the rider recognizes that the rider is not carrying the mechanical key at the time of fuel refilling or unlocking of a helmet.

SUMMARY OF THE INVENTION

The present invention addresses the above described conditions, and an object of the present invention is to provide a theft prevention apparatus for a leisure vehicle that enables a rider to turn on and off a main switch without taking off gloves when mounting the leisure vehicle and that eliminates a need for the rider to take out a mechanical key or the like to unlock a tank cap at the time of fuel refilling, etc.

According to a first aspect of the present invention, there is provided a theft prevention apparatus for a leisure vehicle comprising a portable device configured to transmit a specified user identification code; a lock device including a lock bar configured to lock or unlock a handle of the leisure vehicle by a protruded operation or a retracted operation thereof; a mechanical key configured to cause the protruded operation and the retracted operation of the lock bar; and a key hole into which the mechanical key is inserted; a lock operation stopper member configured to enable or disable the protruded operation and the retracted operation of the lock bar caused by the mechanical key; a pull-out operation stopper member configured to enable or disable a pull-out operation to pull out the mechanical key from the key hole; a lock operation restricting actuator configured to operate to cause the lock operation stopper member to be moved from a position where the protruded operation and the retracted operation of the lock bar caused by the mechanical key are disabled to a position where the protruded operation and the retracted operation of the lock bar are enabled; a pull-out operation restricting actuator configured to operate to cause the pull-out operation stopper member to be moved from a position where the pull-out operation of the mechanical key is disabled to a position where the pull-out operation of the mechanical key is enabled; and a controller including: a memory configured to store a specified user identification code; a receiver configured to receive the specified user identification code transmitted from the portable device; and a processing unit configured to determine whether or not the received user identification code matches the specified user identification code stored in the memory, and to control the lock operation restricting actuator to cause the lock operation stopper member to be moved from the position where the protruded operation and the retracted operation of the lock bar are disabled to the position where the protruded operation and the retracted operation of the lock bar are enabled and to control the pull-out operation restricting actuator to cause the pull-out operation stopper member to be moved from the position where the pull-out operation of the mechanical key is disabled to the position where the pull-out operation of the mechanical key is enabled, when it is determined that the received specified user identification code matches the specified user identification code stored in the memory.

In accordance with the theft prevention apparatus constructed above, the controller controls the lock operation restricting actuator to cause the lock operation stopper member to be moved from the position where the protruded operation and the retracted operation of the lock bar are disabled to the position where the protruded operation and the retracted operation are enabled and the pull-out operation restricting actuator to cause the pull-out operation stopper member to be moved from the position where the pull-out operation of the mechanical key is disabled to the position where the pull-out operation is enabled, when receiving the specified user identification code from the portable device. So, under the state in which the mechanical key is inserted into the lock device of the vehicle, the rider who is carrying the portable device in a pocket or a bag can operate the mechanical key to retract the lock bar to unlock the handle of the vehicle. In fuel refilling, the rider can pull out the mechanical key from the key hole and unlock a fuel tank cap. Therefore, the rider who is carrying the portable device can start the engine and steer the vehicle. Also, the rider who is carrying the portable device can pull out the mechanical key from the key hole to unlock the fuel tank cap. After the fuel refilling is finished and the fuel tank cap is closed, the rider detaches the mechanical key from the tank cap and inserts it into the key hole. The lock operation restricting actuator may be a reciprocatable electric power cylinder, a reciprocatable electric motor, or other, which is configured to move the stopper member to the position where the protruded operation and the retracted operation of the lock bar are disabled to the position where these operations are enabled or from the position where these operations are enabled to the position where these operations are disabled. Or, the lock operation restricting actuator may be an electric power cylinder or an electric motor which is configured to operate to allow the protruded operation and the retracted operation in one direction. In that case, the operations in the opposite direction may be accomplished by utilizing a spring force or a gravitational force, or another actuator may be used to actuate the operations in the opposite direction.

The pull-out operation restricting actuator may be configured to operate to cause the pull-out operation stopper member to be moved from the position where the pull-out operation of the mechanical key is enabled to the position where the pull-out operation of the mechanical key is disabled. The controller may be configured to control the pull-out operation restricting actuator to disable the pull-out operation of the mechanical key at least during running of an engine of the vehicle. In such a construction, inadvertent pull-out operation of the mechanical key can be avoided, during running of the engine.

The lock device may be a cylinder lock. The cylinder lock may include a key switch configured to cause a main electric power supply control circuit to be turned on or off according to a rotational operation of the mechanical key, and the pull-out operation of the mechanical key is disabled with the key switch in an ON-position where the main electric power supply control circuit is in an ON-state. In such a construction, it is possible to avoid the event that the rider inadvertently pulls out the mechanical key and walks away with the key switch in the ON-position where the main electric power supply control circuit is in the ON-state. The pull-out operation of the mechanical key may be disabled by engagement members and engagement grooves of the lock device or otherwise by the pull-out operation restricting actuator under control of the controller.

The lock device may be a cylinder lock. The cylinder lock may include a key switch configured to cause a main electric power supply control circuit to be turned on or off according to a rotational operation of the mechanical key. The pull-out operation restricting actuator may be configured to serve as a rotational operation restricting actuator for actuating a rotational operation stopper member for restricting the rotational operation of the mechanical key inserted into the cylinder lock. The controller may be configured to control the rotational operation restricting actuator to allow the mechanical key to be rotated to an ON-position where a main electric power supply control circuit is in the ON-state, after receiving the specified user identification code from the portable device that matches the user identification code stored in the memory with the key switch in an OFF position where the main electric power supply control circuit is in an OFF-state. In such a construction, if the rider walks away from the vehicle with the mechanical key inserted into the key hole under the state in which the mechanical key is in the OFF-position where the main electric power supply control circuit is in the OFF-state, the third party cannot turn the main electric power supply control circuit from the OFF-state to the ON-state. As a result, the leisure vehicle will not be stolen by a thief.

The lock device may be a cylinder lock. The cylinder lock may include a key switch configured to cause a main electric power supply control circuit to be turned on or off according to a rotational operation of the mechanical key. The controller may be configured to control the pull-out operation restricting actuator to enable the pull-out operation of the mechanical key, after receiving the specified user identification code from the portable device that matches the user identification code stored in the memory with the key switch in an OFF-position where the main electric power supply control circuit is in an OFF-state. In such a construction, if the rider walks away from the vehicle with the mechanical key inserted into the key hole under the state in which the mechanical key is in the position where the main electric power supply control circuit is in the OFF-state, the mechanical key will not be stolen by the thief or a fuel cap or a helmet holder will not be mischievously unlocked and stolen. The rider who is carrying the portable device can pull out the mechanical key from the key hole to unlock the tank cap, the helmet holder or the article container.

The theft prevention apparatus may further comprise a transponder key configured to transmit a user identification code identical to the specified user identification code of the portable device. The receiver of the controller may be configured to receive the user identification code transmitted from the transponder key. Thereby, the rider can use the leisure vehicle by using the transponder key in cases where battery shutoff of the portable device takes place.

The transponder key may have a teeth portion substantially conforming in shape to a teeth portion of the mechanical key. The transponder key may be configured to be insertable into the key hole of the lock device to enable the protruded operation and the retracted operation of the lock bar. In cases where the rider has lost the mechanical key, the transponder key may be used instead in order to cause the lock bar to be protruded and retracted.

The transponder key may be configured to be mountable to the portable device. In cases where the battery shutoff of the portable device takes place, the rider can use the leisure vehicle by using the transponder key mounted to the portable device. In addition, the rider is less likely to lose the transponder key.

According to another aspect of the present invention, there is provided a theft prevention apparatus for a leisure vehicle comprising a portable device configured to transmit a specified user identification code; a lock device including a lock bar configured to lock or unlock a handle of the leisure vehicle by a protruded operation or a retracted operation thereof; a mechanical key configured to cause the protruded operation and the retracted operation of the lock bar; and a key hole into which the mechanical key is inserted; a lock operation stopper member configured to enable or disable the protruded operation and the retracted operation of the lock bar caused by the mechanical key; a pull-out operation restricting mechanism configured to enable or disable a pull-out operation to pull out the mechanical key from the key hole; a lock operation restricting actuator configured to operate to cause the lock operation stopper member to be moved from a position where the protruded operation and the retracted operation of the lock bar caused by the mechanical key are disabled to a position where the protruded operation and the retracted operation of the lock bar are enabled; a controller including: a memory configured to store a specified user identification code; a receiver configured to receive the specified user identification code transmitted from the portable device; and a processing unit configured to determine whether or not the received specified user identification code matches the specified user identification code stored in the memory, and to control the lock operation restricting actuator to cause the lock operation stopper member to be moved from the position where the protruded operation and the retracted operation of the lock bar are disabled to the position where the protruded operation and the retracted operation of the lock bar are enabled, when it is determined that the received specified user identification code matches the specified user identification code stored in the memory.

In accordance with the theft prevention apparatus constructed above, the controller controls the lock operation restricting actuator to move the stopper member from the position where the protruded operation and the retracted operation of the lock bar are disabled to the position where these operations are enabled. The pull-out operation restricting mechanism restricts the pull-out operation to pull out the mechanical key from the key hole. The pull-out operation restricting mechanism may include an actuator or a cylinder lock configured to release engagement state in a specified position in a rotational direction of the mechanical key to pull-out the mechanical key from the key hole. In that case, the pull-out operation is restricted by utilizing the lock operation of the lock operation restricting actuator. In such a construction, with the mechanical key inserted into the lock device of the vehicle, the rider who is carrying the portable device in a pocket or bag can operate the mechanical key to retract the lock bar to thereby unlock the handle. Also, the rider can pull out the mechanical key in fuel refilling, etc. So, the rider who is carrying the portable device can start the engine and steer the vehicle, or can pull-out the mechanical key from the key hole to unlock the fuel tank cap. After the fuel refilling is finished and the fuel tank cap is closed, the rider detaches the mechanical key from the fuel tank cap and inserts it into the key hole. Thus, the rider can perform ON-OFF operations of the lock bar of the vehicle to steer the vehicle without taking off gloves. In addition, the rider need not carry the mechanical key in the pocket or the like because the mechanical key may remain inserted into the key hole when the rider is not steering the vehicle. The lock operation restricting actuator may be a reciprocatable electric power cylinder, a reciprocatable electric motor, etc. which is configured to move the stopper member to the position where the protruded operation and the retracted operation of the lock bar are disabled to the position where these operations are enabled or from the position where these operations are enabled to the position where these operations are disabled. Or, the lock operation restricting actuator may be an electric power cylinder or an electric motor which is configured to operate to allow the protruded operation and the retracted operation in one direction. In that case, the operations in the opposite direction may be accomplished by utilizing a spring force or a gravitational force, or another actuator may be used to actuate the operations in the opposite direction.

The theft prevention apparatus for a vehicle may further comprise a rotational operation stopper member configured to restrict the rotational operation of the mechanical key to the lock position and from the lock position to an unlock position of the mechanical key may serve as the lock operation stopper member. The lock device may be a cylinder lock configured to allow the lock bar to be protruded by rotation of the mechanical key to a lock position and to allow the mechanical key to be pulled out from the key hole by rotation of the mechanical key to a pull-out position. The lock operation restricting actuator may be configured to cause the rotational operation stopper member to a restriction position where the rotational operation of the mechanical key is restricted. By using the characteristic of the cylinder lock in this way, the number of actuators can be reduced, and the operation thereof and the control process therefor can be simplified.

The rotational operation stopper member may be configured to be able to restrict the rotational operation of the mechanical key to the pull-out position.

The above and further objects and features of the invention will more fully be apparent from the following detailed description with accompanying drawings.

DETAILED DESCRIPTION OF THE PREFERRED EMBODIMENTS

Now, embodiments of a theft prevention apparatus for a leisure vehicle according to the present invention will be described with reference to the accompanying drawings. By way of example, a motorcycle which is one type of the leisure vehicle will be described herein.

Embodiment 1

Figure 1:
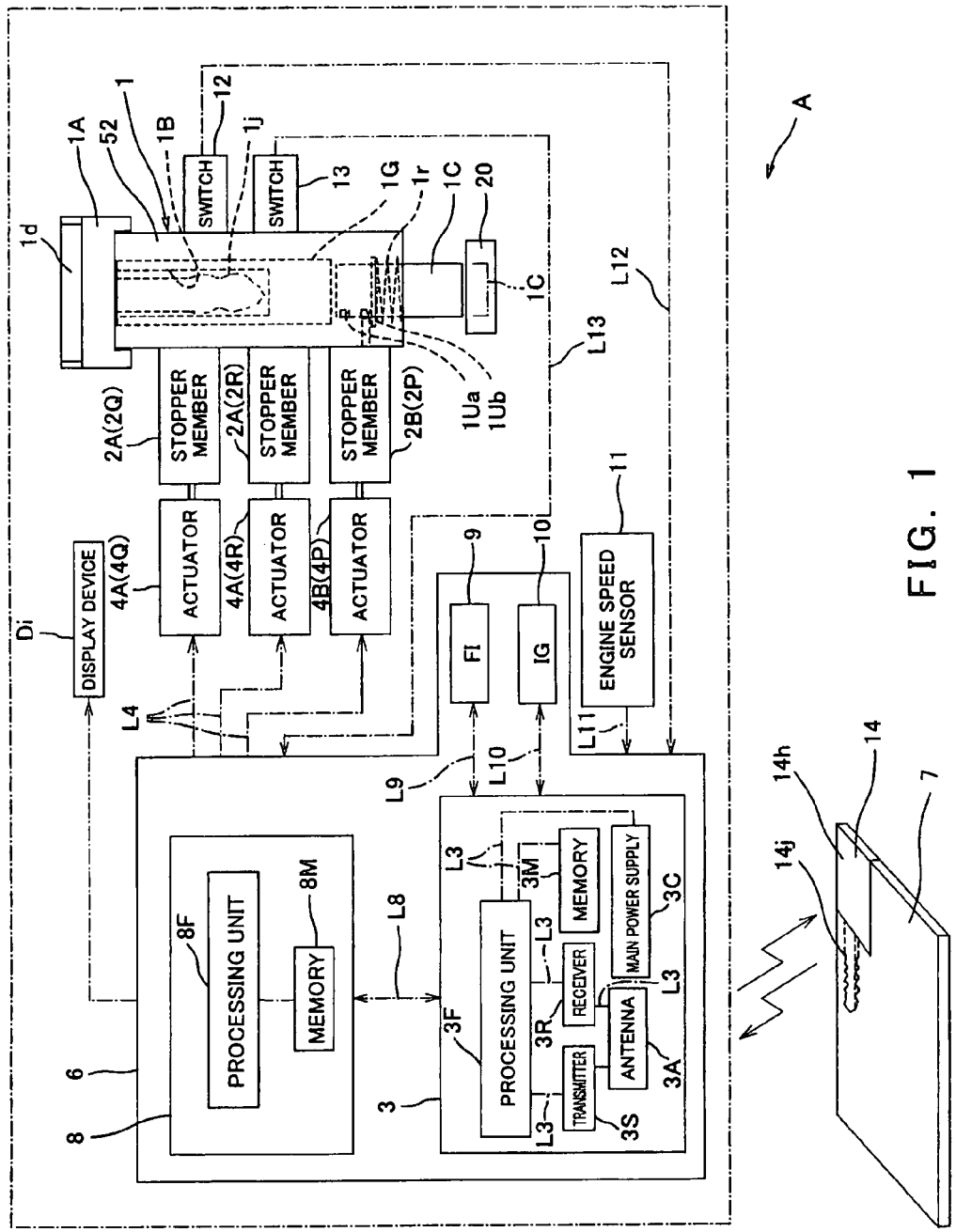
FIG. 1 is a view schematically showing a construction of an entire theft prevention apparatus of a motorcycle according to a first embodiment of the present invention.
Figure 18:
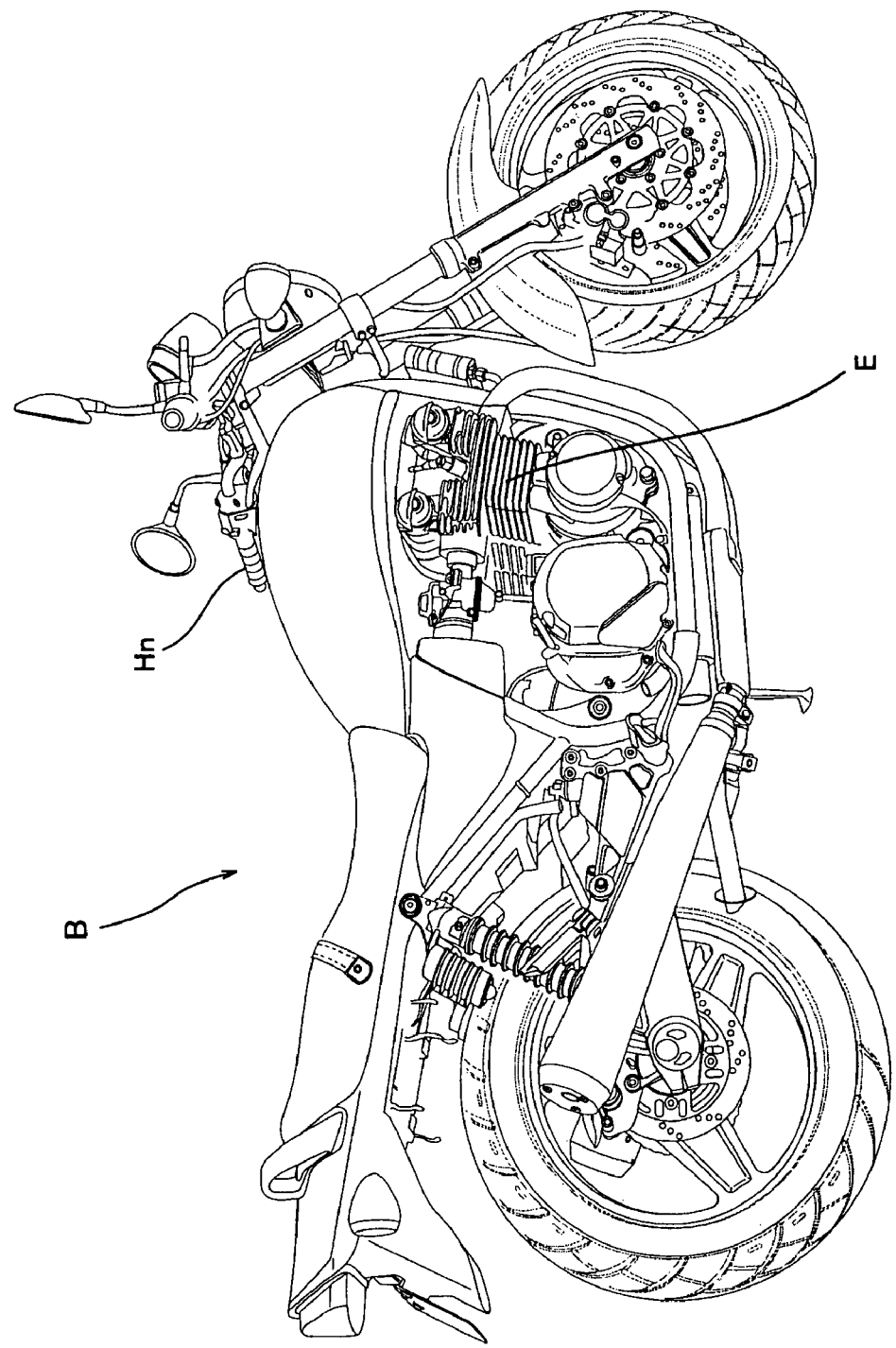
FIG. 18 is a side view of the motorcycle equipped with the theft prevention apparatus of FIG. 1.

Turning now to FIG. 1, a theft prevention apparatus A according to a first embodiment includes a lock device 1 having a cylinder lock portion, a controller 6, and a portable device 7 carried by a rider. The lock device 1 includes a mechanical key 1A, a first stopper member 2A configured to restrict a rotational operation and a pull-out operation of the mechanical key 1A, a first actuator 4A configured to actuate the first stopper member 2A, a second stopper member 2B configured to restrict a protruded operation and a retracted operation of a lock bar 1C, a second actuator 4B configured to actuate the second stopper member 2B, and the lock bar 1C that is attached to a movable part (steering shaft) side of a vehicle body of the motorcycle B and is configured to be engageable with a fixed part (head pipe) 20 side of the vehicle body so as to lock rotation of a handle Hn (see FIG. 18). This arrangement is merely exemplary, and the lock bar 1C may alternatively be attached to the fixed part side of the vehicle body and be configured to be engageable with the movable part side of the vehicle body.

The controller 6 includes a handle lock module 8 configured to control the operation of the first actuator 4A and the operation of the second actuator 4B.

Figure 2:
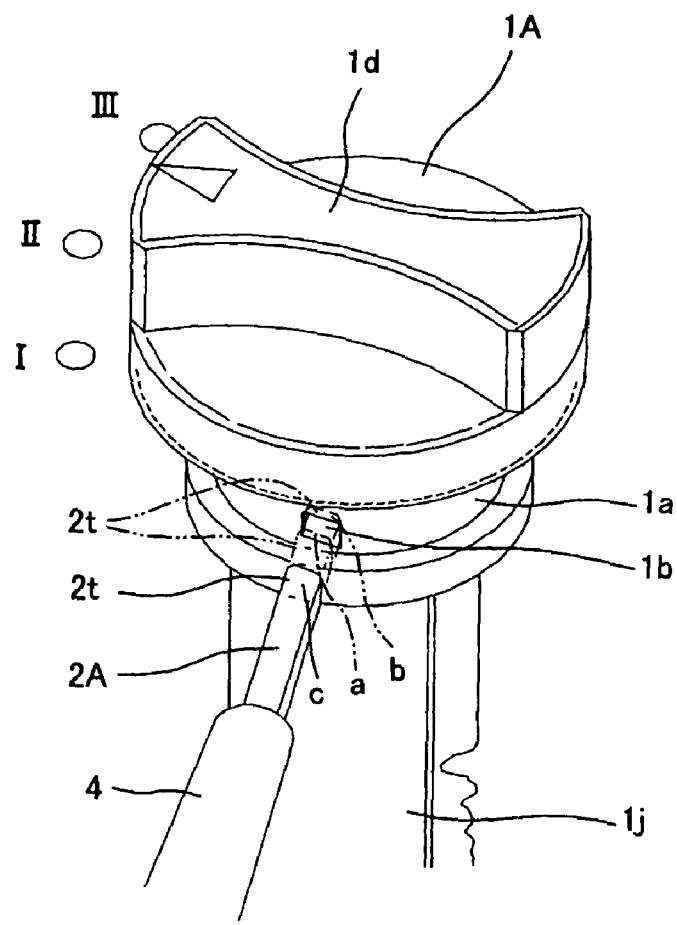
FIG. 2 is a perspective view showing a part of a mechanical key, a stopper member, and an actuator shown in FIG. 1.

As shown in FIG. 2, the first stopper member 2A serves as a pull-out operation stopper member configured to restrict the pull-out operation of the mechanical key 1A and a rotational operation stopper member configured to restrict a rotational operation of the mechanical key 1A. The first actuator 4A serves as a pull-out operation restricting actuator and a rotational operation restricting actuator of the lock device 1. The first actuator 4A is extended (protruded) or retracted so that a tip end portion 2t of the first stopper member 2A is in a first position a, a second position b, or a third position c (see FIGS. 2 and 7) as described later.

Figure 8:
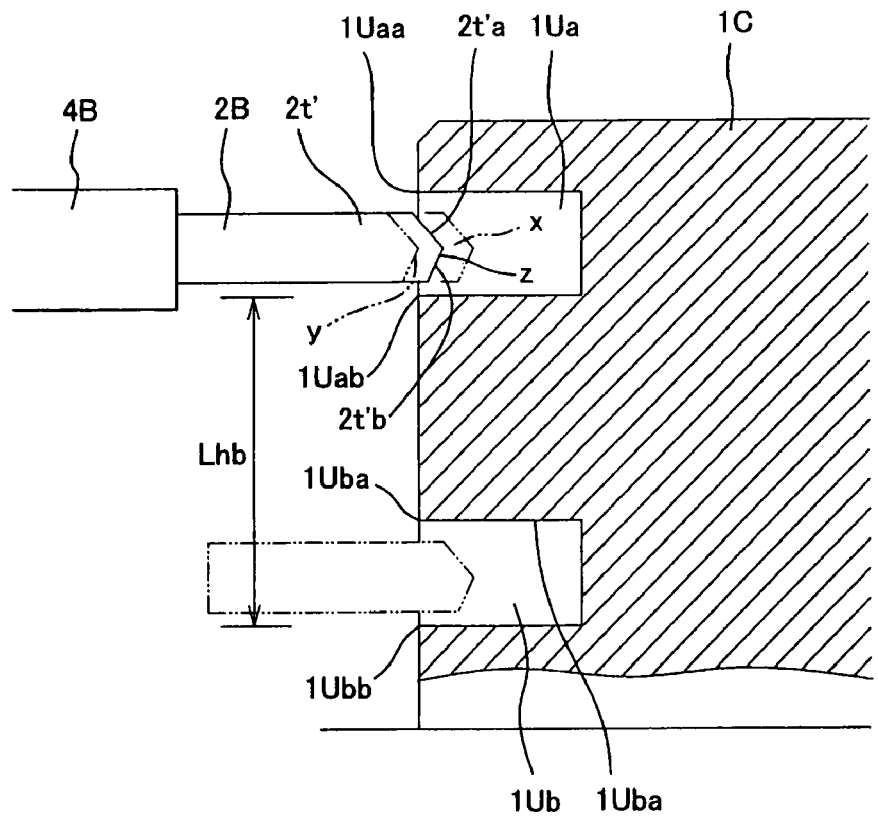
FIG. 8 is a partially enlarged view showing a construction of a lock bar having engagement grooves, a second stopper member, and a second actuator shown in FIG. 1.

The second stopper member 2B serves as a lock operation stopper member 2P of the lock device 1 and the second actuator 4B serves as a lock operation restricting actuator 4P of the lock device 1. As shown in FIG. 8, the second actuator 4B is extended and retracted so that a tip end portion of the second stopper member 2B is in a protruded position x, a retracted position y, or an intermediate position z. The second stopper member 2B engages with the lock bar 1C in one of the protruded position x, the retracted position y, and the intermediate position z, enabling or disabling the protruded operation or the retracted operation of the lock bar 1C that is caused by a protruded operation and a retracted operation of the mechanical key 1A.

In an alternative embodiment, as shown in FIG. 1, the first stopper member 2A may be replaced by the lock operation stopper member 2P, a pull-out operation stopper member 2Q for restricting the pull-out operation of the mechanical key 1A, and a rotational operation stopper member 2R for restricting the rotational operation of the mechanical key 1A, which are separately provided. In addition, the first and second actuators 4A and 4B may be replaced by the lock operation restricting actuator 4P, a pull-out operation restricting actuator 4Q, and a rotational operation restricting actuator 4R which are separately provided. The former construction is preferable, to achieve fewer components and fewer assembly steps, and lightweight.

In this embodiment, the first actuator 4A and the second actuator 4B are each comprised of a reciprocatable electric power cylinder. Alternatively, they may be comprised of a reciprocatable electric motor or otherwise may be comprised of an electric power cylinder or electric motor configured to actuate one-way movement in one direction. When the actuator configured to actuate the one-way movement is used, a spring such as a return spring or a gravitational force may be utilized to achieve movement in the opposite direction.

Figure 11:
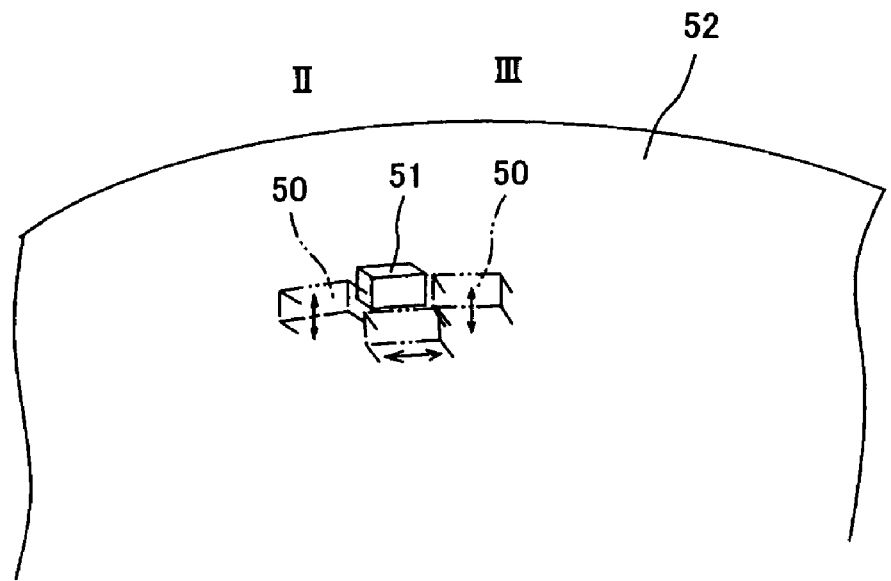
FIG. 11 is an enlarged perspective view of a stop mechanism including engagement members and an engagement groove.

As shown in FIG. 1, the lock device 1 further includes a cylinder 1G having a key hole 1B into which the mechanical key 1A is inserted, and the above described lock bar 1C. The lock bar 1C is configured to be pressed down in FIG. 1 by the cylinder 1G to be locked at a lock position and to return from the lock position to an unlock position by a force applied from a spring 1r biased upward in FIG. 1. The cylinder 1G is biased upward by a force applied by a spring (not shown). As shown in FIG. 11, the rotation of the cylinder 1G is restricted by a known stop mechanism, for example, a stop mechanism including a stopper protrusion 50 provided to the cylinder 1G (see FIG. 1) and a stopper member 51 formed at a cylinder case 52 to restrict rotational movement of the stopper protrusion 50. The cylinder 1G is configured to be rotatable from III position to II position or from the II position to the III position by pressing down and rotating the cylinder 1G, whereas the cylinder 1G is rotatable between the I position and the II position of FIG. 2 merely by rotating the cylinder 1G.

As shown in FIGS. 1 to 5 and 7, the mechanical key 1A is provided at a top portion thereof with a rotation knob 1d that is configured to be grabbed with the rider's fingers. The top portion of the mechanical key 1A is recessed upward in cross-section so as to cover an upper surface of the key hole 1B from above in order to inhibit entry of rain and other foreign matter into the key hole 1B. The knob 1d is sized so that the rider wearing the gloves can easily grab it. To improve anti-theft functionality, the top portion including the knob 1d of the mechanical key 1A is made of an impact-resistant material, for example, metal such as steel, aluminum, titanium, etc., or an impact-resistant resin such as ABS (acrylonitrile butadiene styrene) resin.

The mechanical key 1A has a teeth portion 1j of a predetermined concave-convex shape to enable mechanical locking or mechanical unlocking. The teeth portion 1j of the mechanical key 1A is inserted into the cylinder 1G, enabling mechanical unlocking.

Figure 3:
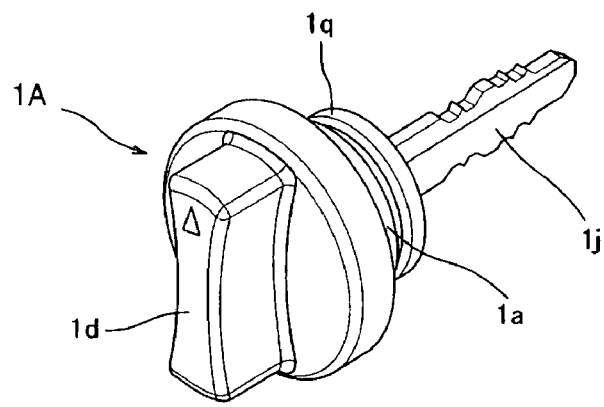
FIG. 3 is a perspective view showing a construction of the mechanical key of FIG. 2.
Figure 4:
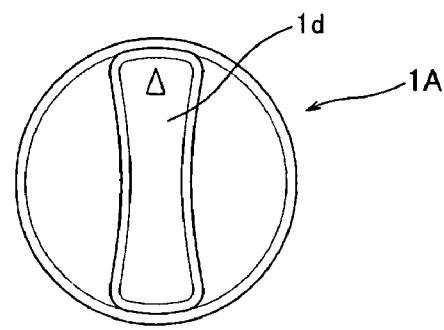
FIG. 4 is a plan view showing the construction of the mechanical key of FIG. 2.
Figure 5:
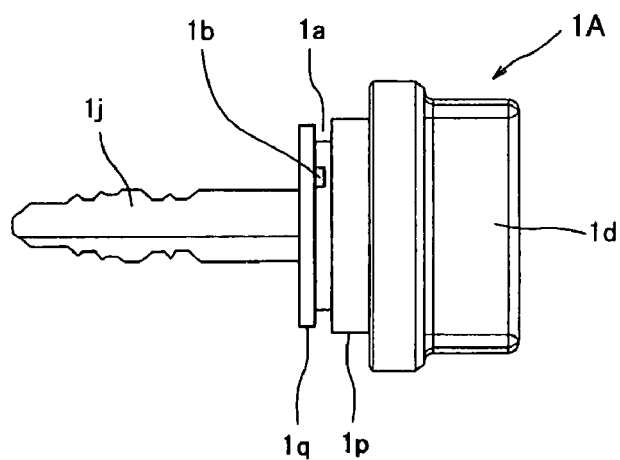
FIG. 5 is a side view showing the construction of the mechanical key of FIG. 2.
Figure 7:
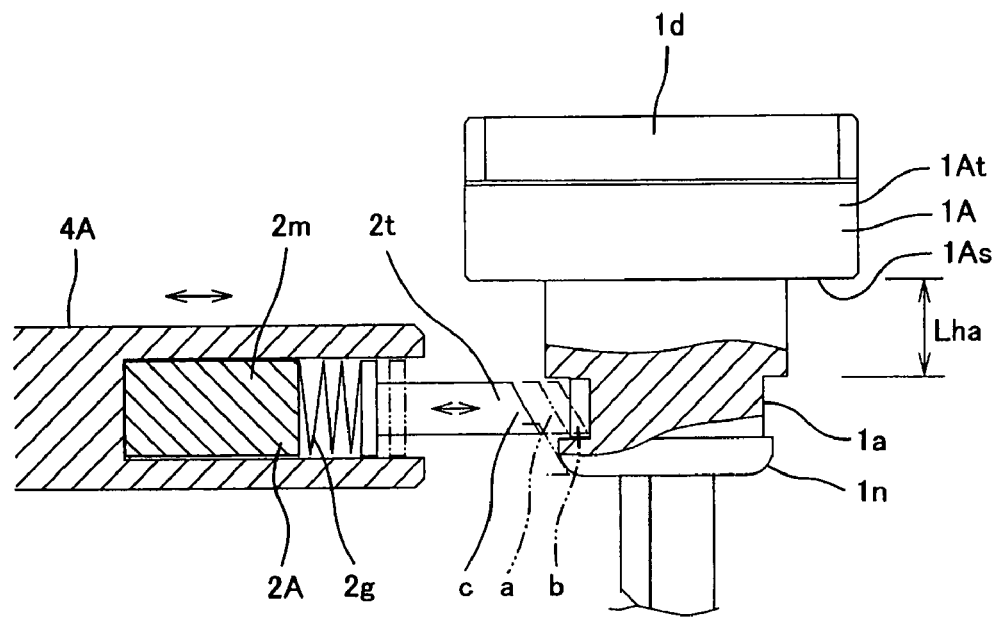
FIG. 7 is a partially enlarged view showing a construction of the mechanical key, a first stopper member, and a first actuator shown in FIG. 1.

As shown in FIG. 2 or FIG. 3 or 5, the mechanical key 1A has a small-diameter portion 1a formed at an upper region and an engagement hole 1b formed on the small-diameter portion 1a to extend horizontally. At upper and lower sides of the small-diameter portion 1a, portions 1p and 1q (see FIG. 5)

having a diameter larger than that of the small-diameter portion 1p are formed. In this embodiment, the diameter of the lower portion 1q is slightly smaller than that of the upper portion 1p. The tip end portion 2t of the first stopper member 2A shown in FIG. 7 is positioned at the small-diameter portion 1a, restricting upward pull-out operation of the mechanical key 1A and downward press operation of the mechanical key 1A. The first stopper member 2A is inserted into the engagement hole 1b, restricting rotational operation (and pull-out operation) of the mechanical key 1A. Therefore, according to extended and retracted operations with different strokes of the first actuator 4A provided at a base end side of the first stopper member 2A, the tip end portion 2t of the first stopper member 2A can be in the first position a where the tip end portion 2t is in the small-diameter portion 1a and is uninserted into the engagement hole 1b, in the second position b where the tip end portion 2t is protruded from the first position a and is inserted into the engagement hole 1b to disable the rotational operation of the mechanical key 1A, or in the third position c where the tip end portion 2t is retracted from the small diameter-portion 1a to enable the rotational operation and the pull-out operation of the mechanical key 1A. As shown in FIG. 7, the first stopper member 2A includes two member portions, i.e., the tip end portion 2t and a base end portion 2m. The tip end portion 2t of the first stopper member 2A is biased forward (rightward in FIG. 7) by the spring 2g with respect to the base end portion 2m so that the tip end portion 2t can be retracted. As shown in FIG. 7, in this embodiment, a tip end of the tip end portion 2t has a tiled surface in which an upper end thereof is retracted with respect to a lower end thereof in the longitudinal direction, and a lower end of the head portion of the mechanical key 1A is chamfered as indicated by 1n. In this structure, with the tip end portion 2t in the first position a or the second position b, the lower end 1n contacts the tiled surface of the tip end portion 2t, causing the spring 2g to be compressed so that the tip end portion 2t is retracted. In this state, the mechanical key 1A can be inserted into the key hole 1B. In FIGS. 2 and 7, the third position c of the tip end portion 2t of the stopper member 2 is indicated by a solid line, and the first position a and the second position b of the stopper member 2 are indicated by two-dotted line.

As shown in FIG. 1 or 8, the second actuator 4B is extended or retracted to cause the second stopper member 2B to be horizontally protrusible or retractable so as to be laterally engageable with an engagement groove 1Ua or an engagement groove 1Ub formed on a side surface of the lock bar 1C so that movement of the lock bar 1C to the unlock position, i.e., vertical movement of the lock bar 1C is restricted with the lock bar 1C in the lock position or movement of the lock bar 1C to the lock position, i.e., vertical movement of the lock bar 1C is restricted with the lock bar 1C in the unlock position. As shown in FIG. 8, a tip end portion 2t' of the second stopper member 2 has upper and lower tilted surfaces 2t'a and 2t'b in which its upper end is backward further than its lower end and its intermediate point is protruded forward from the upper end and the lower end to form the upper tilted surface 2t'a and the lower tilted surface 2t'b. With the second stopper member 2B in an intermediate position as indicated by a solid line of FIG. 8, the upper tiled surface is in contact with an upper edge portion 1Uaa of the engagement groove 1Ua or an upper edge portion 1Uba of the engagement groove 1Ub and the lower tiled surface is inward relative to a lower edge portion 1Uab of the engagement groove 1Ua or a lower edge portion 1Ubb of the engagement groove 1Ub. In this state, by pressing down the mechanical key 1A, the lock bar 1C is allowed to move from the unlock position to the lock position and not to move from the lock position to the unlock position. In other words, only downward movement of the lock bar 1C is allowed. In FIG. 8, two-dotted line indicates that the second stopper member 2B is protruded and engage with the engagement groove 1Ub and does not indicate the vertical movement of the second stopper member 2B, and the solid line indicates the vertical position of the second stopper member 2B.

A vertical dimension Lhb between the engagement groove 1Ua and the engagement groove 1Ub shown in FIG. 8 is substantially equal to a vertical dimension Lha between an upper end surface of the first stopper member 2A and a lower surface 1As of a top portion 1At of the mechanical key 1A shown in FIG. 7. To be precise, the dimension Lha is, approximately 1 mm larger than the dimension Lhb in the embodiment. Accordingly, by pressing down the mechanical key 1A, with the tip end portion 2t of the first stopper member 2A in the first position a and the tip end of the second stopper member 2B in the intermediate position z, the lock bar 1C is moved downward to the lock position.

The first actuator 4A is communicatively coupled to the controller 6 through a signal line L4 (see FIG. 1). As shown in FIG. 7, based on a signal from the controller 6, the first actuator 4A moves the stopper member 2A to one of the first position a, the second position b, and the third position c. The second actuator 4B is communicatively coupled to the controller 6 through the signal line L4 (see FIG. 1). As shown in FIG. 8, based on a signal from the controller 6, the second actuator 4B moves the tip end of the second stopper member 2B to one of the retracted position y, the protruded position x and the intermediate position z. In the retracted position y, the second stopper member 2B is retracted from the engagement groove 1Ua and 1Ub and thus is not engageable with the lock bar 1C. So, in the retracted position y, the vertical movement of the lock bar 1C is allowed. In the intermediate position z, the upper tilted surface of the two tilted surfaces of the second stopper member 2B contacts the upper edge portion 1Uaa of the engagement groove 1Ua or the upper edge portion 1Uba of the engagement groove 1Ub to allow downward movement of the lock bar 1C. In the protruded position x, the second stopper member 2B engages with the engagement grooves 1Ua or 1Ub so as not to allow vertical movement of the lock bar 1C.

Turning to FIG. 1 again, the controller 6 includes an ECU (engine control unit) 3 forming a controller module, the handle lock module 8 communicatively coupled to the ECU 3 through a signal line L8, an FI (fuel injection) module 9 communicatively coupled to the ECU 3 through a signal line L9, and an IG (ignition) module 10 communicatively coupled to the ECU 3 through a signal line L10. The ECU 3 includes a receiver 3R configured to receive a user ID code transmitted by radio from the portable device 7, a transmitter 3S configured to transmit a user ID code transmission request signal to the portable device 7, and an antenna 3A coupled to the receiver 3R and to the transmitter 3S through signal lines. The ECU 3 further includes a main electric power supply control circuit 3C configured to control on and off of a main power supply of the motorcycle, and a memory 3M for storing the user ID code and others. The ECU 3 includes a processing unit 3F containing a CPU configured to determine whether or not the user ID codes match and to execute a variety of control processes. The processing unit 3F is communicatively coupled to the receiver 3R, the transmitter 3S, the main electric power supply control circuit 3C and the memory 3M through control lines L3. The controller 6 including the ECU 3 is communicatively coupled through a signal line L11 to an engine speed sensor 11 configured to detect an engine speed of the engine E (see FIG. 18).

The engine speed sensor 11 is attached to a region near a crankshaft (not shown) of the engine E (see FIG. 18), but may be attached to a region near other components such as a camshaft so long as it is rotating when the engine E is running.

The lock device 1 has a key switch configuration in which a switch 12 is turned on and off by rotating the mechanical key 1A to a predetermined position. To be specific, the switch 12 is turned on by rotating the mechanical key 1A from the II position to the I position in FIG. 2, and based on the ON-signal, the ECU 3 causes the main electric power supply control circuit 3C (see FIG. 1) of the motorcycle B (see FIG. 18) to be turned on, while the switch 12 is turned off by rotating the mechanical key 1A from the I position to the II position or to the III position in FIG. 2, and based on the OFF-signal, the ECU 3 causes the main electric power supply control circuit 3C of the motorcycle B to be turned off. Turning to FIG. 1, the lock device 1 is provided with a switch 13 configured to be in an ON-state while the mechanical switch 1A is pushed down over a small distance. The switch 13 is turned on when the mechanical key 1A is pushed down in the II position or in the III position in FIG. 2. The ON-signal is sent to the controller 6 through a signal line L13. Receiving the signal, the processing unit 3F of the ECU 3 of the controller 6 causes the transmitter 3s to transmit the user ID code request signal to the portable device 7 via the antenna 3A. In this embodiment, the switch 12 and the switch 13 are formed by non-contact proximity switches. In this embodiment, the distance over which the mechanical key 1A is pushed down to cause the switch 13 to be turned on is set to a dimension that is substantially as small as a gap formed between the first stopper member 2A and the engagement hole 1b with the first stopper member 2A engaging with the engagement hole 1b (see FIG. 2), or a gap formed between the second stopper member 2B and the engagement groove 1Ua (or 1Ub) with the second stopper member 2B engaging with the engagement groove 1Ua (or 1Ub) (see FIG. 7), for example, approximately 0.3 mm to 1 mm. Therefore, the switch 13 can be turned on by pushing down the mechanical key 1A with the tip end portion 2t of the first stopper member 2A engaging with the engagement hole 1b or with the tip end portion 2t' of the second stopper member 2B engaging with the engagement groove 1Ua or 1Ub. The switch 12 and the switch 13 are not intended to be limited to the above described proximity switches but may be other suitable switches such as contact switches, pressure-type switches or mechanical switches.

After transmitting the user ID code request signal, the controller 6 enters a wait state to receive a confirmation signal including the user ID code from the portable device 7. The controller 6 contains a program in the memory 3M to execute a process as described below based on the confirmation signal received from the portable device 7. To be specific, the processing unit 3F of the controller 6 calls a specified user ID code stored in the memory 3M of the ECU 3, and compares the user ID code transmitted from the portable device 7 to the specified user ID code to determine whether or not these user ID codes match.

The handle lock module 8 includes a processing unit 8F and a memory 8M that contains the specified user ID code. The processing unit 8F is configured to receive, from the ECU 3, the user ID code transmitted from the portable device 7, and to compare this user ID code to the specified user ID code stored in the memory 8M to determine whether or not these user ID codes match. Likewise, the FI module 9 includes a processing unit and a memory that contains the specified user ID, although not shown. As in the handle lock module 8, the processing unit of the FI module 9 is configured to compare the user ID code from the ECU 3 to the specified user ID code stored in the memory to determine whether or not these user ID codes match.

The handle lock module 8, the FI module 9, the IF module 10, and the ECU 3 are separate units that are placed in different positions and are communicatively coupled to each other through signal lines, thus configuring the controller 6. In this configuration, even if a thief has replaced the ECU 3 of the controller 3 by an ECU containing a user ID code of a portable device owned by the thief, the handle lock module 8, and the FI module 9 remain inactive, because their processing units determine that the thief's user ID code does not match the specified user ID codes stored in the corresponding memories. In other words, the thief is unable to steal the vehicle unless the thief has replaced all of the ECU 3, the handle lock module 8, and the FI module 9 by the modules containing in the memories the user ID code of the thief's portable device. Thus, in this embodiment, anti-theft function is effectively performed.

The portable device 7 is configured to transmit the user ID code stored therein, upon receiving the user ID code request signal from the ECU 3 of the controller 6.

As shown in FIG. 1, in this embodiment, the portable device 7 is provided with a transponder key 14 as a part of it. The transponder key 14 is mounted to the portable device 7 to form a card key. A teeth portion 14j of the transponder key 14 has a concave-convex shape conforming to the concave-convex shape of the teeth portion 1j (see FIG. 3) of the mechanical key 1A. The transponder key 14 can be inserted into the key hole 1B of the lock device 1 to enable mechanical unlocking. The transponder key 14 contains a transponder unit in a top portion 14h thereof that contains the user ID code to be read out by the ECU 3 when the transponder key 14 is located near, in cases where battery shutoff of the portable device 7 occurs. In alternative embodiment, a transponder unit with a transponder function may be built into the portable device 7 instead of the transponder key 14.

Figure 6:
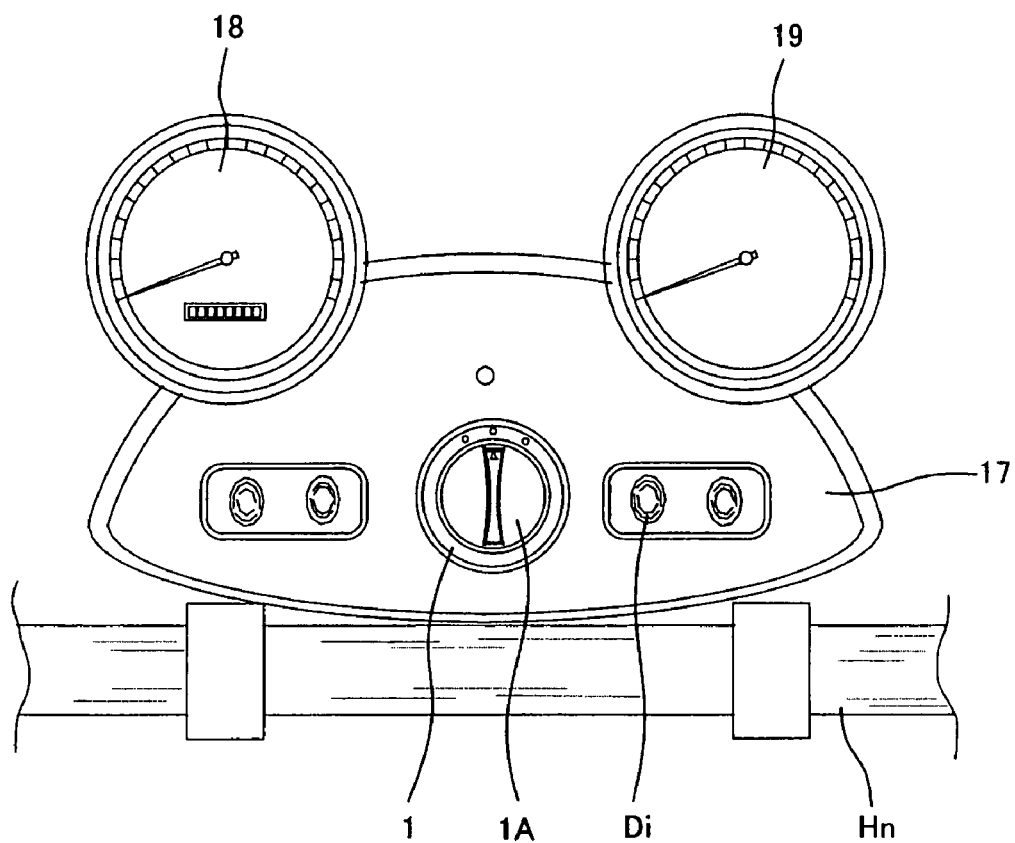
FIG. 6 is a plan view of a meter panel section of the motorcycle, showing arrangement of a key hole (covered with the mechanical key) and others in a lock device of FIG. 1.

As shown in FIG. 6, the lock device 1 and a display device Di are arranged on a meter panel 17 disposed in front of a center region of the handle Hn of the motorcycle B (see FIG. 18) to be located in the vicinity of a speed meter 18 or a tachometer 19 in such a manner that the key hole 1B (shown in FIG. 1) of the lock device 1 and a display portion of the display device Di are visible. In such arrangement, the mechanical key 1A and the like are easily operated and the display device Di is easily visually recognized, but they may alternatively be arranged in other locations such as a side portion or the like of the vehicle.

In this embodiment, the first actuator 4A and the second actuator 4B are each comprised of an electric motor as a drive source and a rack pinion mechanism configured to change a rotational movement of the electric motor to a linear movement. As a matter of course, the first actuator 4A and the second actuator 4B may alternatively be comprised of other actuators such as solenoids.

Figure 9:
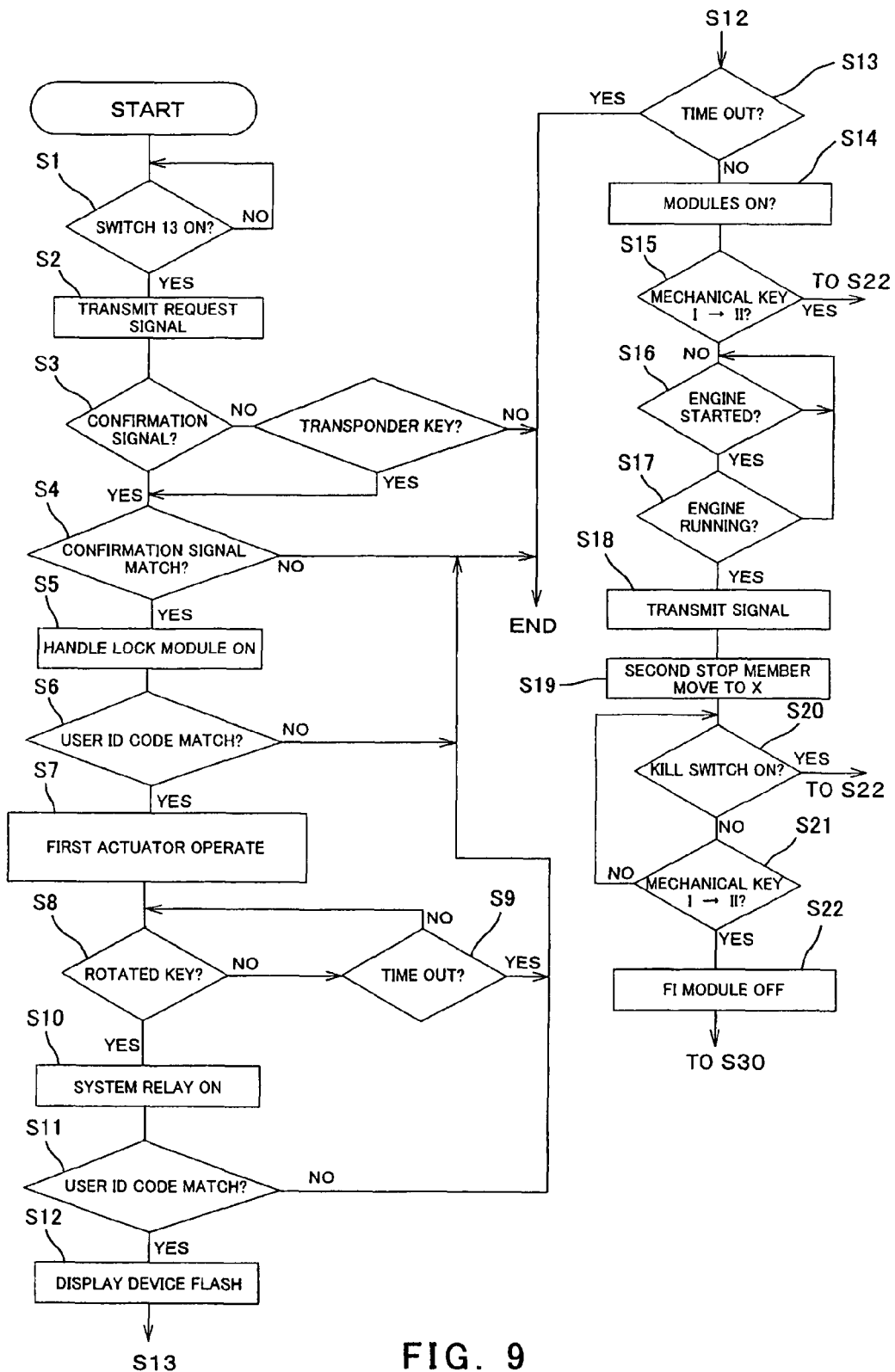
FIG. 9 is a flowchart showing a control process of an unlock control mode of a controller shown in FIG. 1.

The operation of the theft prevention apparatus A of the motorcycle B constructed above will be described below. First, an unlock control mode in which the theft prevention apparatus A is unlocked will be described with reference to a flowchart of FIG. 9.

Here it is assumed that the motorcycle B is parked under the condition in which the lock bar 1C of the lock device 1 is in the ON-state, i.e., its lower end portion is in the position indicated by two-dotted line in FIG. 1, the lock handle Hn (see FIG. 18) is locked (mechanical key 1A is in the III position in FIG. 2), and the mechanical key 1A is inserted into the key hole 1B. Also, it is assumed that a rider who is an owner of the motorcycle B is carrying the portable device 7 in the pocket or the like and is going to use the motorcycle B. Although the mechanical key 1A is inserted into the key hole 1B of the motorcycle B, a third party who is not carrying the portable device 7 is unable to pull out the mechanical key 1A from the key hole 1B and rotate it, because the first stopper member 2A is in engagement with the engagement hole 1b of the mechanical key 1A (first stopper member 2A is in the second position b). Thus, the anti-theft function is active.

Under this condition, the controller 6 determines whether or not the rider has pushed down the mechanical key 1A inserted into the key hole 1B of the motorcycle B, i.e., the switch 13 is in the ON-state (step S1). If it is determined that the switch 13 is in the ON-state, the processing unit 3F of the ECU 3 causes the transmitter 3S to transmit the user ID code request signal to the portable device 7 via the antenna 3A (step S2).

After the user ID code request signal has been transmitted, the ECU 3 enters the wait state to wait for the confirmation signal containing the specified user ID code from the portable device 7 (step S3). Receiving the user ID code request signal, the portable device 7 carried in the pocket or the like of the rider transmits the confirmation signal containing the specified user ID code.

Receiving the confirmation signal in the receiver 3R via the antenna 3A, the ECU 3 sends the confirmation signal to the processing unit 3F. The processing unit 3F determines whether or not the user ID code of the received confirmation signal matches the user ID code stored in the memory 3M (step S4). If it is determined that there is no confirmation signal, then the processing unit 3F determines whether or not the transponder key 14 exists. If it is determined that the transponder key 14 exists, processing unit 3F executes the determination process in step S4. On the other hand, if it is determined that the transponder key 14 does not exist, then the controller 6 terminates the control process for disabling the anti-theft function.

If it is determined that the user ID codes match in step S4, the ECU 3 authenticates the received confirmation signal, activates the handle lock module 8 for actuating the first actuator 4A and the second actuator 4B, and sends the received user ID code to the handle lock module 8 (step S5). On the other hand, if it is determined that the user ID codes do not match in step S4, then the controller 6 terminates the control process for disabling the anti-theft function.

Then, the processing unit 8F compares the received user ID code to the user ID code stored in the memory 8M of the handle lock module 8 (step S6).

If it is determined that the user ID codes match in step S6, then the handle lock module 8 causes the first actuator 4A and the second actuator 4B to operate and the display device Di to display information indicating that the user ID codes match and sends a signal indicating that the user ID codes match to the ECU 3, while the ECU 3 receives the signal from the handle lock module 8 and the processing unit 3F of the ECU 3 activates a timer (step S7). On the other hand, if it is determined that the user ID codes do not match in step S6, then the controller 6 terminates the control process for disabling the anti-theft function.

In step S7, the first actuator 4A and the second actuator 4B operate to move the tip end portion 2t of the first stopper member 2A engaging with the engagement hole 1b from the second position b to the third position c and to move the tip end portion 2t' of the second stopper member 2B to the retracted position y away from the lock bar 1C. Therefore, the mechanical key 1A is released from the first stopper member 2A, and the lock bar 1C is released from the second stopper member 2B. In this state, the mechanical key 1A can be pulled out from the key hole 1B or can be pressed down and be rotated from the III position to the II position. Also, the mechanical key 1A can be pulled out from the key hole 1B with the mechanical key 1A rotated to the II position. The mechanical key 1A can be rotated or pulled out because the rider who has unlocked the theft prevention apparatus A is carrying the specified portable device 7 or the transponder key 14. In other words, the rider who is not carrying the portable device 7 or the transponder key 14 cannot pull out or rotate the mechanical key 1A.

In step S7, the display device Di flashes three times at suitable time intervals as the information, to inform the rider that engagement by the first and second stopper members 2A and 2B has been released.

The portable device 7 continues to transmit the confirmation signal at suitable time intervals and the controller 6 continues to determine whether or not the user ID codes match, during a time taken to rotate the mechanical key 1A from the II position to the I position in step S8 described later. So, if the controller 6 does not receive the confirmation signal from the portable device 7 during the time taken to rotate the mechanical key 1A from the II position to the I position in step S8 following step S7, then the controller 6 sends the signal indicating this to the handle lock module 8. Receiving the signal, the handle lock module 8 controls the first actuator 4A to move the tip end portion 2t of the first stopper member 2A from the third position c to the first position a. In this state, a third party which is not carrying the portable device 7 cannot pull out the mechanical key 1A. Also, a system relay described layer is in an OFF-state. Thus, the anti-theft function is active, and therefore the mechanical key 1A will not be stolen.

In this embodiment, the rotation of the mechanical key 1A from the III position to the II position is accomplished only by the rider's operation of pressing down and rotating the mechanical key 1A to release mechanical engagement. As a result, the handle Hn is rotatable freely.

While receiving the confirmation signal from the portable device 7, the controller 6 is in the wait state until the mechanical key 1A is rotated to the I position. That is, the controller 6 is in the wait state to determine whether or not the switch 12 is in the ON-state (step S8).

If it is determined that the mechanical key A is not rotated from the II position to the I position within a predetermined time, then the ECU 3 determines whether or not the timer activated in step S7 has reached a specified time (step S9). If it is determined that the timer has not reached the specified time in step S9, then the ECU 3 returns to step S8, whereas if it is determined that the timer has reached the specified time, then the ECU 3 terminates the control process for disabling the anti-theft function.

If it is determined that the rider has rotated the mechanical key 1A from the II position to the I position in the wait state in step S8, the ECU 3 continues to determine whether or not the user ID codes match and to authenticate the user ID code, and the main electric power supply control circuit 3C turns on the system relay (step S10). Upon the system relay being turned on, the IG module 10 and the FI module 9 are turned on as well.

In the ON-state, the FI module 9 receives the user ID code from the ECU 3, and the processing unit of the FI module 9 determines whether or not the received user ID code matches the user ID code stored in the memory of the FI module 9 (step S11).

If it is determined that these two user ID codes match in step S11, the display device Di flashes continuously to inform the rider that the user ID codes match (step S12). This makes it possible for the rider to visually recognize that the FI module 9 of the motorcycle B, namely a fuel system is in the ON-state. On the other hand, if it is determined that the user ID codes do not match in step S11, then the ECU 3 terminates the control process for disabling the anti-theft function.

The processing unit 3F of the ECU 3 determines whether or not the timer activated in step S7 has reached the specified time (step S13).

If it is determined that the timer has not reached the specified time in step S13, the processing unit 3F of the ECU 3 determines whether or not the handle lock module 8, the FI module 9, and the IF module are in the ON-states, based on the signals from these modules (step S14). On the other hand, if it is determined that the timer has reached the specified time in step S13, then the ECU 3 terminates the control process for disabling the anti-theft function.

When the ECU 3 receives the ON-signals from the modules 8, 9, and 10 in step S14, the rider is able to start the engine E, i.e., steer the motorcycle B.

Under this condition, the controller 6 determines whether or not the mechanical key 1A has been rotated from the I position to the II position (step S15).

If it is determined that the mechanical key 1A has not been rotated from the I position to the II position in step S15, the controller 6 determines whether or not a starter button has been operated to start the engine E, based on a signal from the engine speed sensor 11 (step S16). If the engine speed of the engine E is a cranking engine speed, the controller 6 determines that the engine E has been started. Alternatively, the ECU 3 may determine whether or not the engine E has been started, based on whether or not a starter circuit has been energized. If it is determined that the mechanical key 1A has been rotated from the I position to the II position in step S15, the controller 6 moves to the step S22.

If it is determined that the starter button of the motorcycle B has been pressed in step S16, the controller 6 determines whether or not the engine E is running, based on the signal from the engine speed sensor 11 (step S17). To be specific, the controller 6 determines that the engine E is running when the engine speed is equal to or higher than an idling engine speed. On the other hand, if it is determined that the starter button of the motorcycle B has not been pressed in step S16, the controller 6 returns to step S16.

If it is determined that the engine E has started in step S17, the ECU 3 of the controller 6 sends to the handle lock module 8 a signal indicating that the engine E is running (step S18).

Receiving the signal, the handle lock module 8 causes the first actuator 4A to operate to move the tip end portion 2t of the first stopper member 2A to the first position a and causes the second actuator 4B to operate to move the tip end portion 2t' of the second stopper member 2B to the protruded position x (step S19). As a result, the tip end portion 2t of the first stopper member 2A engages with the small-diameter portion 1a to inhibit upward pull-out operation of the mechanical key 1A and the tip end portion 2t' of the second stopper member 2B engages with the engagement groove 1Ub of the lock bar 1C to inhibit downward protruded operation of the lock bar 1C. This makes it possible to avoid the rider's inadvertent pull-out operation of the mechanical key 1A and to inhibit the lock bar 1C from moving to the lock position, during running of the engine E.

While the motorcycle B is traveling or the engine E is running, the controller 6 continues to execute the determination process to determine whether or not the user ID codes match and authentication process of the user ID code at suitable time intervals. Under this condition, the controller 6 determines whether or not a kill switch equipped in the motorcycle B has been pressed (step S20).

If it is determined that the kill switch has not been pressed in step S20, the controller 6 determines whether or not the mechanical key 1A has been rotated from the I position to the II position (step S21). If it is determined that the kill switch has been pressed in step S20, then the controller 6 moves to step S22. If it is determined that the mechanical switch 1A has not been rotated from the I position to the II position in step S21, then the controller 6 returns to step S20.

During running of the engine E of the motorcycle B, the steps S20 and S21 are repeated.

If it is determined that the mechanical key 1A has been rotated from the I position to the II position in step S21 or the kill switch has been pressed in step S20, the controller 6 causes the FI module 9 to be tuned off to stop supply of the fuel to the engine E (step S22). Thereby, the engine stops.

Figure 10:
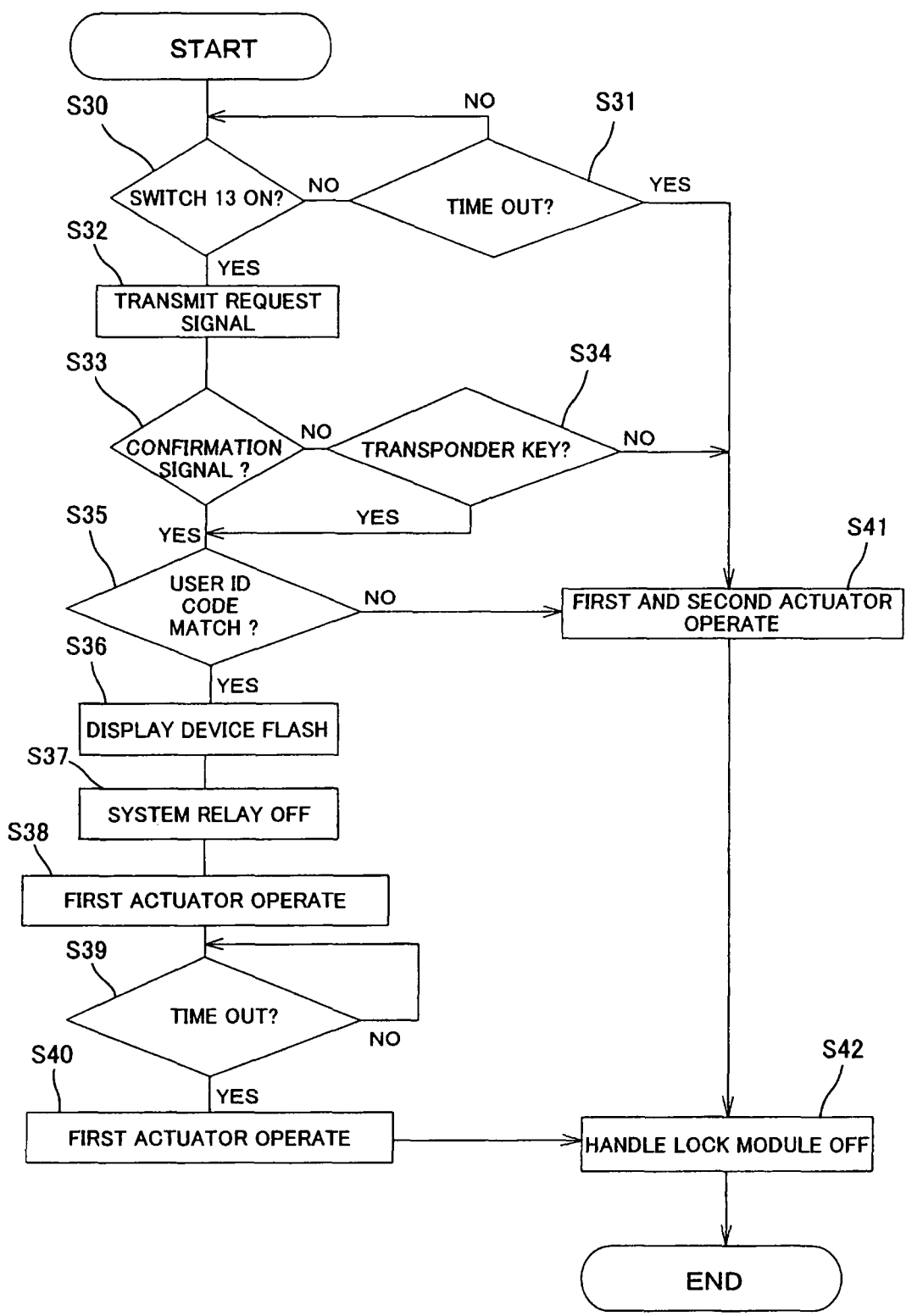
FIG. 10 is a flowchart showing a control process of a lock control mode of the controller shown in FIG. 1.

Subsequently, a lock control mode in a case where the engine E of the motorcycle B running is stopped and the theft prevention apparatus A of the motorcycle B is turned ON will be described with reference to the flowchart of FIG. 10.

If it is determined that the rider carrying the portable device 7 has pressed the kill switch of the motorcycle B in step S20 or the rider has rotated the mechanical key 1A from the I position to the II position in step S15 or S21, then the controller 6 moves to step S22 and the engine E is stopped. In this case, the controller 6 moves to the control flow chart of the lock control mode illustrated in FIG. 10.

In the lock control mode, the controller 6 is in the wait state for predetermined time, for example, 5 to 10 minutes, until the mechanical key 1A has been pushed down to turn on the switch 13 (step S30).

Then, the controller 6 determines whether or the specified time has elapsed (step S31). If it is determined that the specified time has not elapsed, the controller 6 returns to step S30. On the other hand, if it is determined that the specified time has elapsed, the controller 6 moves to step S41.

In the wait state in step S30, the mechanical key 1A is rotated from the I position to the II position or to the III position and thereby is pressed down to turn on the switch 13, the processing unit 3F of the ECU 3 causes the transmitter 3S to transmit the user ID code request signal via the antenna 3A (step S32).

After transmitting the user ID code request signal, the controller 6 enters the wait state to receive the confirmation signal containing the user ID code from the portable device 7 (step S33). The portable device 7 carried in the pocket or the like of the rider receives the user ID code request signal and transmits the confirmation signal containing the specified user ID code to the controller 6.

The confirmation signal is received in the receiver 3R via the antenna 3A in the controller 6 and sent to the processing unit 3F of the controller 6, and the processing unit 3F determines whether or not the user ID code of the received confirmation signal matches the user ID code stored in the memory 3M of the controller 6 (step S35). If it is determined that there is no confirmation signal, then the ECU 3 determines whether or not the transponder key 14 exists (step S34). If it is determined that the transponder key 14 exists in step S34, then the processing unit 3F executes the determination process in step S35. On the other hand, if it is determined that the transponder key 14 does not exist, the controller 6 moves to step S41 described later.

If it is determined that the user ID code of the confirmation signal from the portable device 7 matches the user ID code stored in the memory 3M in step S35, then the display device Di flashes at specified time intervals for 3 seconds to inform the rider that the confirmation signals do match (step S36). If it is determined that the user ID codes do not match in step S35, the controller 6 moves to step S41.

After the step S36, the signal is sent to the handle lock module 8 and the main electric power supply control circuit 3C turns off the system relay (step 37).

Receiving the signal, the handle lock module 8 causes the first actuator 4A to operate to move the tip end portion 2t of the first stopper member 2A to the third position c and causes the second actuator 4B to operate to move the tip end portion 2t' of the second stopper member 2B to the intermediate position z to allow the lock bar 1C to be pressed down, and activates the timer (step S38). As a result, the rider can pull out the mechanical key 1A from the key hole 1B and press down the mechanical key 1A to allow the lock bar 1C to be protruded downward. In this state, when the rider presses down the mechanical key 1A, the lock bar 1C engages with the fixing member 20 and the lock bar 1C is stopped by the second stopper member 2B. Thus, handle lock of the handle Hn is executed.

Then, the handle lock module 8 determines whether or not the actuated timer has reached specified time (step S39).

If it is determined that the timer has reached the specified time in step S39, the handle lock module 8 causes the first actuator 4A to operate to move the tip end portion 2t of the first stopper member 2A to the first position a (Step S40). In this state, the tip end portion 2t of the first stopper member 2A is positioned at the small-diameter portion 1a so that the mechanical key 1A cannot further be pulled out.

If it is determined that the timer has reached the specified time in step S31, if it is determined that the user ID codes do not match in step S35, or if it is determined that the transponder key 14 does not exist in step S34, then the handle lock module 8 causes the first actuator 4A to operate to move the tip end portion 2t of the first stopper member 2A to the first position a and causes the second actuator 4B to be retracted to move to the tip end portion 2t' of the second stopper member 2B to the intermediate position z (step S41). In this state, the tip end portion 2t of the first stopper member 2A is positioned at the small-diameter portion 1 so that the mechanical key 1A cannot be further pulled out. By pressing down the mechanical key 1A to protrude the lock bar 1C downward via the cylinder 1G, the lock bar 1C is caused to engage with the fixing member 20. Thus, only the lock operation of the lock bar 1 becomes possible. In this manner, anyone, i.e., the rider or the third party can execute handle lock operation.

After the steps 40 and 41, the power of the handle lock module 8 is turned off (step S42), thus completing the control process of the theft prevention apparatus A. In this state, if the mechanical key 1A is inserted into the key hole 1B, the rider cannot pull out the mechanical key 1A. In addition, by pressing down the mechanical key 1A, the lock bar 1C is moved down to enable the handle lock operation.

In cases where battery shutoff of the portable device 7 or the like takes place, the rider may bring the transponder key 14 mounted to the portable device 7 closer to the ECU 3, to be precise, the antenna 3A coupled to the ECU 3 so that the ECU 3 can read out the user ID code from the transponder key 14, thus performing the function as in the case where the portable device 7 is functional. In addition, the rider may insert the transponder key 14 into the key hole 1B to perform the function as in the case of using the portable device 7 and the mechanical key 1A. Therefore, even if the rider has lost the mechanical key 1A pulled out from the key hole 1B, the function of the mechanical key 1A, including the anti-theft function is achieved by inserting the transponder key 14 into the key hole 1B.

Whereas the handle lock module 8 retracts the second actuator 4B to move the tip end portion 2t' of the second stopper member 2B to the intermediate position z in step S41, the tip end portion of the second stopper member 2B may alternatively be moved to the protruded position x so that the rider who is not carrying or has lost the portable device 7 or the third party cannot press down the mechanical key 1A. In that case, the third party who is not carrying the portable device 7 cannot rotate the mechanical key 1A from the unlock position (II position) to the lock position (III position).

Embodiment 2

The lock device 1 of the theft prevention apparatus A of the first embodiment may be replaced by a lock device 101 shown in FIGS. 12 to 17. In the second embodiment, a theft prevention apparatus A1 is able to perform the same function as the theft prevention apparatus A of the first embodiment, by using the lock device 101 including one actuator. In FIGS. 12 through 17, the components of the lock device 101 of the second embodiment are identified by reference numbers created by adding 100 to the reference numbers used to identify the same or corresponding components of the lock device 1, and will not be further described in detail.

Figure 12:
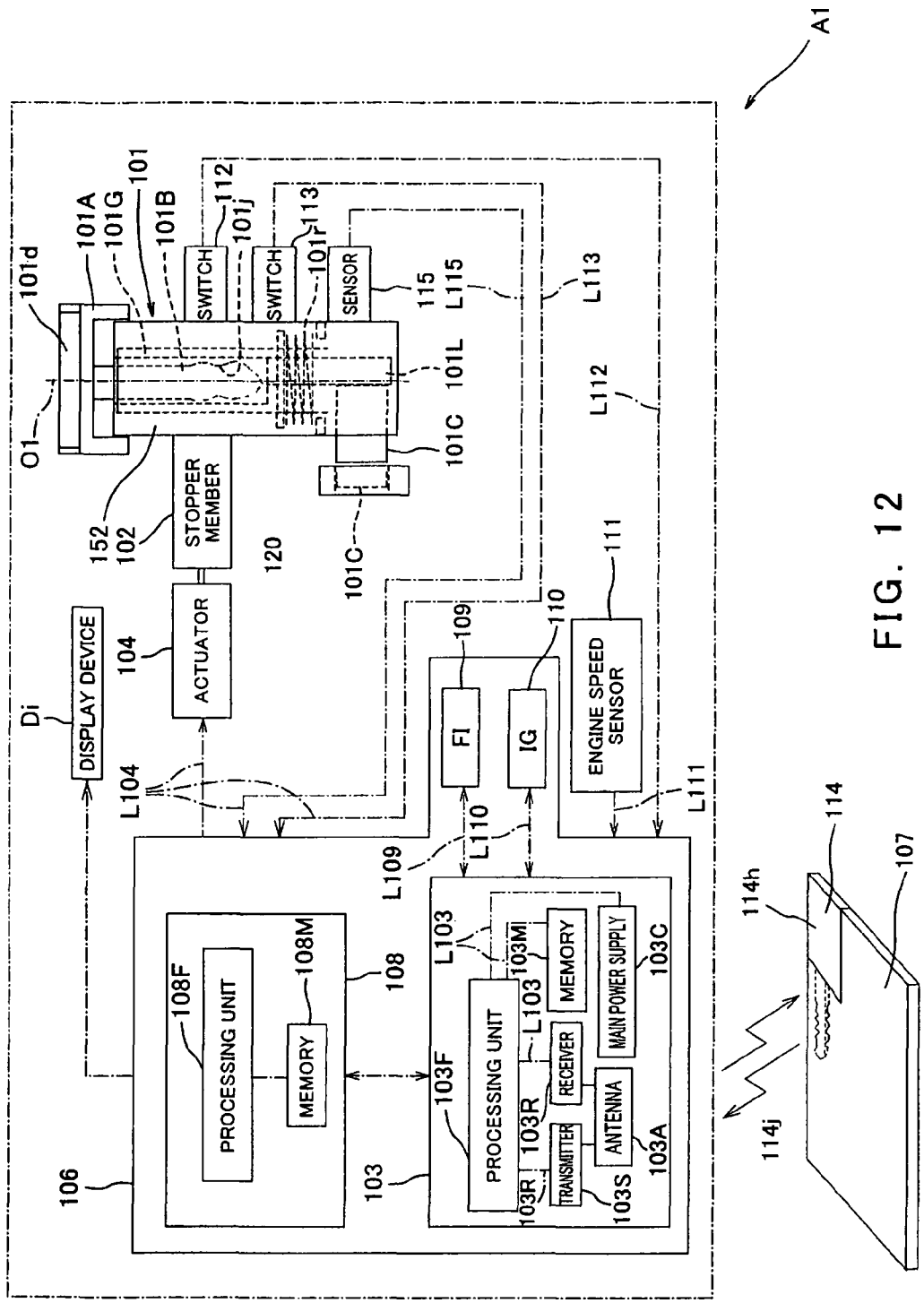
FIG. 12 is a view schematically showing a construction of an entire theft prevention apparatus of the motorcycle according to a second embodiment.
Figure 13:
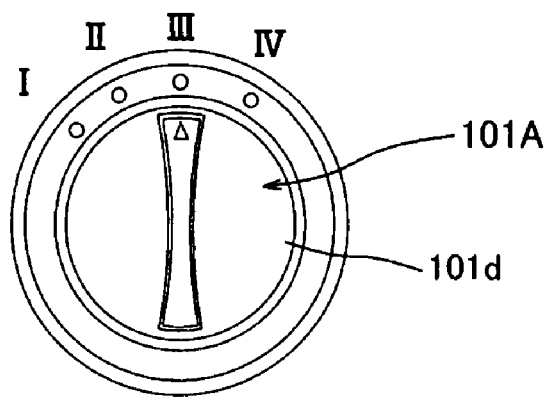
FIG. 13 is a plan view showing a part of a lock device including a mechanical key of FIG. 12.

Turning to FIG. 12, the theft prevention apparatus A1 includes the lock device 101, a rotational operation stopper member 102 serving as a lock operation stopper member and a pull-out operation stopper member, an ECU 103, a rotational operation restricting actuator 104 configured to activate the rotational operation stopper member 102, a controller 106, a portable device 107, a handle lock module 108, an FI (fuel injection) module 109, an IG (ignition) module 110, an engine speed sensor 111, a switch (key switch in the second embodiment) 112 for turning on and off the main electric power supply control circuit of the motorcycle B, a switch 113, a transponder key 114, and a rotational position sensor 115 configured to detect a rotational position of the mechanical key 101A formed of a hole IC switch (a magnet switch of which form is a small chip with 3 metal lines) and the like.

Figure 17:
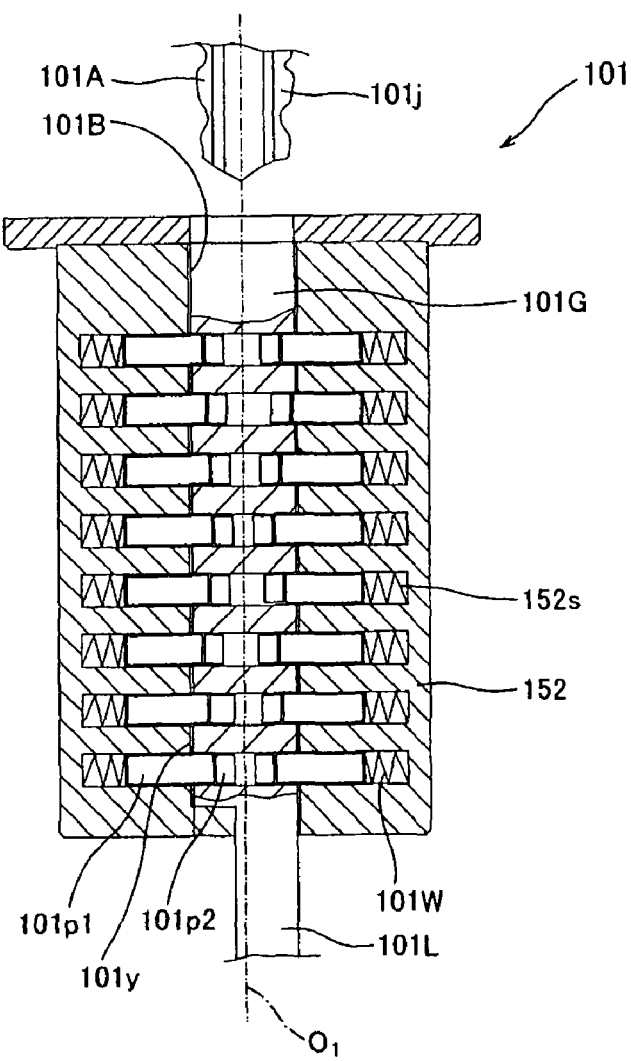
FIG. 17 is a partial cross-sectional view showing a cylinder and a cylinder case forming a cylinder lock of the lock device of FIG. 12, and engagement members disposed between the cylinder and the cylinder case.

In the lock device 101 of the second embodiment, whether or not the mechanical key 101A can be pulled out from the key hole 113 is achieved by mechanical construction as in general cylinder lock. To be specific, as shown in FIG. 17, a pair of engagement members (pins in this embodiment) 101p1 and 101p2 that are radially protrusible and retractable are mounted between a cylinder 101G and a cylinder case 152 in which the cylinder 101G is rotatably accommodated. The cylinder 101G is configured to be rotatable with respect to the cylinder case 152 only when a joint face 101y between the pair of the engagement members 101p1 and 101p2 is positioned at an interface between the cylinder case 152 and the cylinder 101G. In the cylinder lock, when the mechanical key 101A is pulled out, the engagement members 101p1 and 101p2 of the cylinder case 152 are moved radially outward because of the concave-convex teeth shape of the mechanical key 101A according to the pull-out operation of the mechanical key 101A. A space 152s that permits that outward movement is formed radially outward of the engagement members 101p1 and 101p2 with the mechanical key 101a in a specified position in the rotational direction thereof, to be specific, IV position of FIG. 13, in the second embodiment. Therefore, only when the mechanical key 101A is in the IV position (see the state in FIG. 17), the engagement members 101p1 and 101p2 permit the mechanical key 101A to be pulled out or inserted. In other words, when the mechanical key 101A is in positions other than the IV position in the rotational direction, i.e., the I to III positions, the engagement members 101p1 and 102p2 cannot move radially outward because of the absence of the space 152s, and thus the mechanical key 101A cannot be pulled out or inserted in the I to III positions because of mechanical restriction.

When the mechanical key 101A is inserted into the key hole 101B, the teeth portion 101j of the mechanical key 101A is brought into contact with the engagement members 101p2. Thereby, the engagement members 101p1 and 101p2 protrude radially outward over a distance equal to a protruded dimension of the teeth shape of the teeth portion 101j, and the joint face 101y is positioned at the interface between the cylinder case 152 and the cylinder 101G, enabling the rotational operation of the mechanical key 101A.

By providing a construction similar to the mechanical construction of the first embodiment of FIG. 11, the mechanical key 1A cannot be rotated between the I and II positions and between the III and IV positions unless it is pressed down.

Figure 14:
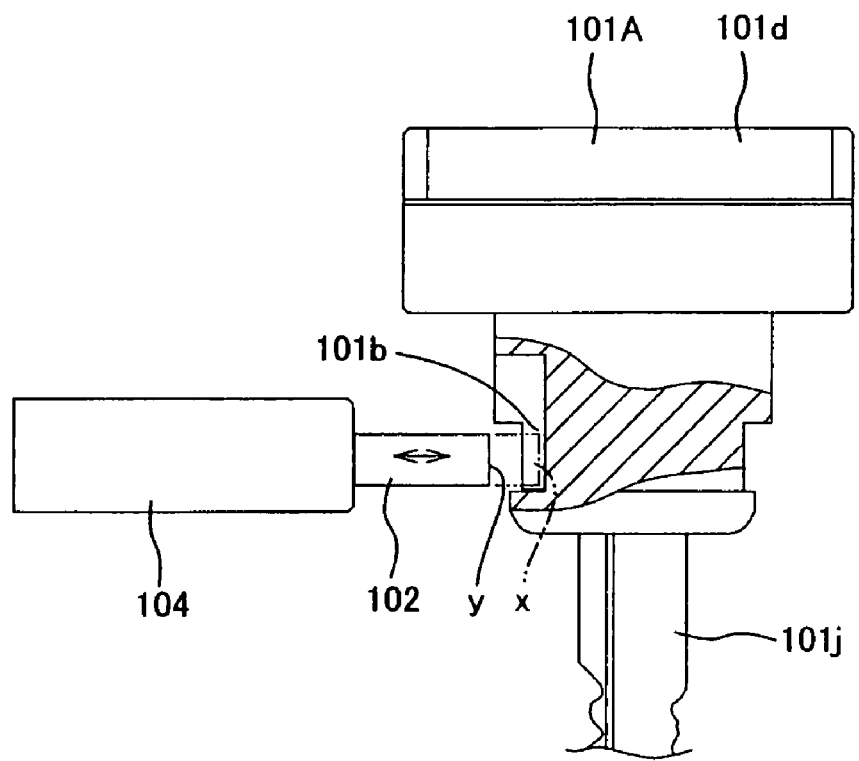
FIG. 14 is a side view showing a part of the mechanical key of FIG. 12, a rotational operation restricting member and an actuator.

In the lock device 101 of the second embodiment, the mechanical key 101A is configured to be rotatable to any one of the I to IV positions. In other words, the IV position is created exclusively for the pull-out operation or the insertion operation of the mechanical key 101A. As shown in FIG. 14, the mechanical key 101A is caused to be unrotatable with the rotational operation stopper member 102 protruded toward the mechanical key 101A to engage with the engagement groove 101b and is caused to be rotatable with the rotational operation stopper member 102 retracted from the engagement groove 101b.

To enable or disable the rotational operation of the mechanical key 101A, the controller 106 controls the operation of the actuator 104 configured to actuate the rotational operation stopper member 102. In addition, in the second embodiment, the controller 106 controls the operation of the rotational operation stopper member 102 to enable or disable the rotational operation of the mechanical key 1A from any one of the I, II, and IV positions to another position. As shown in FIG. 14, the actuator 104 is configured to move to the protruded position x and the retracted position y.

Upon the rider rotating the mechanical key 101A from the II position to the I position, the cylinder 101G of the lock device 101 is rotated, causing an eccentric shaft 101L as shown in FIG. 12 that is attached integrally with a lower end of the cylinder 101G and eccentrically from a rotational center axis O1 to push the lock bar 101C so as to protrude it laterally.

Figure 15:
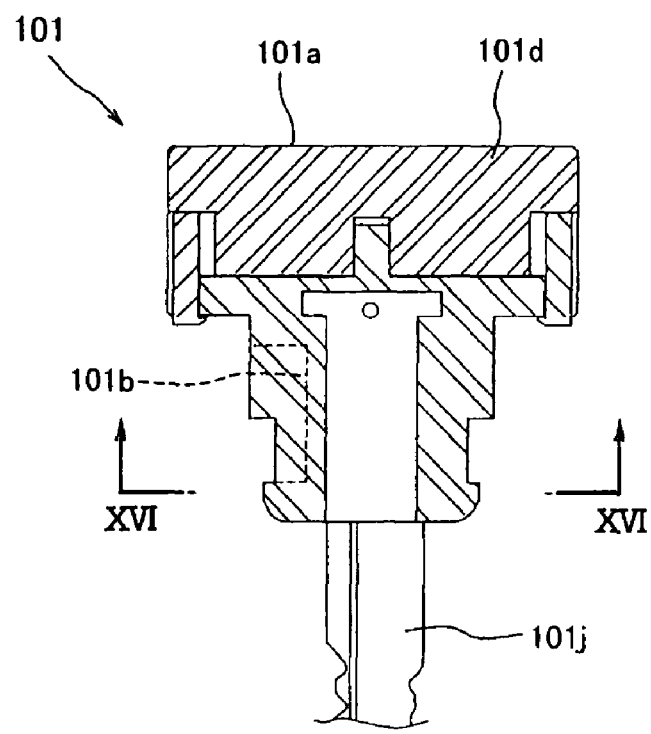
FIG. 15 is a longitudinal sectional view showing a construction of the mechanical key of FIGS. 12 and 13.
Figure 16:
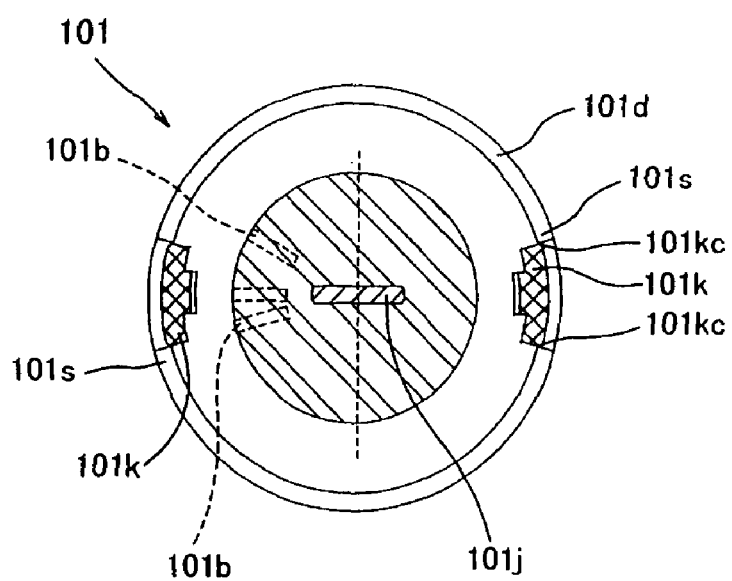
FIG. 16 is a cross-sectional view taken in the direction of arrows along line XVI-XVI of FIG. 15.

As shown in FIG. 15, in the lock device 101, the mechanical key 101A has the teeth portion 101j and a knob 101d. The knob 101d is configured not to be rotated together with the teeth portion 101j by application of a force more than a predetermined rotational torque and to be rotated together with the teeth portion 101j by application of a force less than the predetermined rotational torque. To be specific, as shown in FIG. 15 or 16, chamfered regions 101kc formed on outer peripheral edge portions 101k integral with a member of the teeth portion 101j engage with cut portions 101s of the knob 101d so as to transmit a rotational torque. By application of the force more than the predetermined rotational torque, the cut portions 101s are deformed radially outward, so that the outer peripheral portions 101k slip relative to the cut portions 101s, and thus they do not rotate together. With such a construction, the teeth portion 101j will not be damaged even if the mechanical key 1A is forcibly rotated. In the second embodiment, the outer peripheral portions 101k are made of wear-resistant material.

As described above and as shown FIG. 13, in the lock device 101 of the second embodiment, the mechanical key 101 is movable to any one of the I to IV positions. In the I, II, and IV positions, among these four positions, the rotational operation stopper member 102 (see FIG. 14) engages with the engagement grooves 101b (FIG. 16) to inhibit the rotational operation of the mechanical key 101A. The engagement grooves 101b are formed to correspond to the I, II, and IV positions and to extend in the direction perpendicular to the rotational direction.

In the I position, as indicated by a broken line of FIG. 12, the above described eccentric mechanism (cam mechanism) of the cylinder 101G of the lock device 101 causes the lock bar 101C of the lock device 101 to be protruded so as to lock the handle Hn of the motorcycle B. In addition, in the I position, the switch 112 is in an OFF-state, i.e., the relay of the main electric power supply control circuit 103c of the motorcycle B is in an OFF-state. Therefore, in the I position, the rider cannot bring the motorcycle B to a desired position, and cannot start the engine E (see FIG. 18). That is, the anti-theft function is active.

In the II position, the lock bar 101C of the lock device 101 is retracted as indicated by a solid line of FIG. 12, the handle Hn of the motorcycle B is unlocked, and the switch 112 is in the OFF-state, i.e., the relay of the main electric power supply control circuit 103C is in the OFF-state. Therefore, in the II position, the handle Hn of the motorcycle B is unlocked and thus the rider can operate the handle Hn to bring and move the motorcycle B to a desired position. However, the rider cannot start the engine E (see FIG. 18) because the switch 112 is in the OFF-state.

In the III position, the lock bar 101C of the lock device 101 is retracted (as indicated by a solid line of FIG. 12), the handle Hn of the motorcycle B is unlocked, and the switch 112 is in the ON-state, i.e., the relay of the main electric power supply control circuit 103C is in the ON-state. In the III position, the handle lock Hn of the motorcycle B is unlocked and the switch 112 is in the ON-state. Therefore, the rider can start the engine E to steer the motorcycle B if it is determined that the user ID codes match in the authentication process of the user ID code.

In the IV position, the lock bar 101C of the lock device 101 is retracted as indicated by the solid line of FIG. 12, the handle Hn of the motorcycle B is unlocked, and the switch 112 is in the OFF-state, i.e., the relay of the main electric power supply control circuit 103C is in the OFF-state. In the IV position, because of the mechanical construction of FIG. 17, the mechanical key 101A can be pulled out from the key hole 101B of the cylinder 101G as described above. That is, in the IV position, the mechanical key 101A can be pulled out from or inserted into the key hole 101B. Therefore, by positioning the mechanical key 101A to the IV position and pulling it out from the key hole 101B, a cap of a fuel tank or a helmet holder can be locked or unlocked.

Furthermore, in the lock device 101, regardless of whether the mechanical key 101A is in the I, II, III or IV position, the switch 113 is turned on by pushing down the mechanical key 101a over a small distance, enabling the user ID code request signal to be transmitted to the portable device 107 as in the first embodiment.

The lock device 101 constructed above operates as follows.

While the motorcycle B is parked, the handle Hn is locked by setting the mechanical key 101A in the I position, and the controller 106 controls the actuator 104 to form engagement between the rotational operation stopper member 102 and the engagement groove 101b. For this reason, the mechanical key 101A cannot be rotated to the positions other than the I position, and the switch 112 is in the OFF-state with the mechanical key 101A in the I position, effectively preventing theft of the motorcycle B. If a third party attempts to forcibly rotate the mechanical key 101A, only the knob 101d rotates and thus the mechanical key 101a does not rotate.

If the rider or owner carrying the portable device 107 approaches the motorcycle B with the mechanical key 101A set in the I position and pushes down the mechanical key 101A to push the switch 113, the authentication process of the user ID code is executed as in the first embodiment. If it is determined that the user ID codes match in the authentication process, the controller 106 controls the actuator 104 to cause the rotational operation stopper member 102 to be retracted, bringing the rotational operation stopper member 102 and the engagement groove 101b out of engagement. So, the rider can press down and rotate the mechanical key 101A from the I position to the II position. By the rotation of the mechanical key 101A, the lock bar 101C is retracted, releasing handle lock state of the handle Hn. Under this condition, the rider can push and bring the motorcycle B to a desired position. After an elapse of specified time, for example several seconds, with the mechanical key 101A in the II position, the controller 106 causes the actuator 104 to operate to bring the rotational operation stopper member 102 into engagement with the engagement groove 101b, restricting the rotational operation of the mechanical key 101A. Therefore, after the elapse of the specified time, the rider cannot rotate the mechanical key 101A to positions other than the II position.

To rotate the mechanical key 101A from the II position to the I position and from the II position to the III position after the elapse of the specified time, the authentication process of the user ID code becomes necessary again. So, anyone who is not carrying the portable device 107 cannot rotate the mechanical key 101A from the II position to the I position or to the III position. Thus, the anti-theft function is active.

In this state, in order for the rider carrying the portable device 107 to rotate the mechanical key 1A from the II position to the III position, the authentication process of the user ID code is carried out again by pushing down the mechanical key 101A. If it is determined that the user ID codes match in the authentication process, the controller 106 controls the actuator 104 to retract the rotational operation stopper member 102 so as to disengage it from the engagement groove 101b. As a result, the rider can rotate the mechanical key 101A from the II position to the III position, turning on the switch 112. In the III position, the lock bar 101C is retracted and the handle Hn is unlocked. Therefore, the rider can start the engine E of the motorcycle B by turning on the starter switch, enabling steering the motorcycle B.

The rider can press down the mechanical key 101A and rotate it from the III position to the IV position or from the III position to the II position, without the authentication process of the user ID code. Therefore, the rider can quickly stop the engine E by rotating the mechanical key 101A from the III position to the II position or to the IV position.

As in the first embodiment, in the second embodiment, during traveling of the motorcycle B, even if the rider attempts to rotate the mechanical key 101A from the III position to the I position through the II position, the controller 106 determines that the engine E is running based on the signal from the engine speed sensor 111, and inhibits the unlock operation of the actuator 104 so that the rotation of the mechanical key 101A from the II position to the I position is inhibited. Therefore, during running of the engine E, the handle Hn is inhibited from turning to the lock state.

As described above, in the second embodiment, since the mechanical characteristic of the cylinder lock is effectively utilized, the number of components such the actuators or the stopper members can be reduced as compared to the first embodiment. In addition, the actuators are configured to be moved between the ON-position and the OFF-position, and the control process is simplified because components to be controlled are fewer. As a result, the number of steps in the control process can be reduced.

Furthermore, in the lock device 101, if a third party has forcibly rotated the mechanical key 101A to steal the motorcycle B, then only the knob 101d rotates, and the teeth portion 101j of the mechanical key 101A is not rotated together with the cylinder 101G. In this situation, the teeth portion 101j will not be damaged.

Moreover, the theft prevention apparatus for the leisure vehicles is applicable to other leisure vehicles as well as the motorcycle described in the above embodiments.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A theft prevention apparatus for a leisure vehicle comprising:
   a portable device configured to transmit a specified user identification code;
   a lock device including:
      a lock bar configured to lock or unlock a handle of the leisure vehicle by a protruded operation or a retracted operation thereof;
      a mechanical key configured to cause the protruded operation and the retracted operation of the lock bar; and
      a key hole into which the mechanical key is inserted;
   a lock operation stopper member configured to enable or disable the protruded operation and the retracted operation of the lock bar caused by the mechanical key;
   a pull-out operation stopper member configured to enable or disable a pull-out operation to pull out the mechanical key from the key hole;
   a lock operation restricting actuator configured to operate to cause the lock operation stopper member to be moved from a position where the protruded operation and the retracted operation of the lock bar caused by the mechanical key are disabled to a position where the protruded operation and the retracted operation of the lock bar are enabled;
   a pull-out operation restricting actuator configured to operate to cause the pull-out operation stopper member to be moved from a position where the pull-out operation of the mechanical key is disabled to a position where the pull-out operation of the mechanical key is enabled; and
   a controller including:
      a memory configured to store a specified user identification code;
      a receiver configured to receive the specified user identification code transmitted from the portable device; and
      a processing unit configured to determine whether or not the received specified user identification code matches the specified user identification code stored in the memory, and to control the lock operation restricting actuator to cause the lock operation stopper member to be moved from the position where the protruded operation and the retracted operation of the lock bar are disabled to the position where the protruded operation and the retracted operation of the lock bar are enabled, to control the pull-out operation restricting actuator to cause the pull-out operation stopper member to be moved from the position where the pull-out operation of the mechanical key is disabled to the position where the pull-out operation of the mechanical key is enabled, when it is determined that the received specified user identification code matches the specified user identification code stored in the memory, and to control the lock operation restricting actuator to cause the lock operation stopper member to be moved to the position where the protruded operation and the retracted operation of the lock bar are disabled and to control the pull-out operation restricting actuator to cause the pull-out operation stopper member to be moved to the position where the pull-out operation of the mechanical key is disabled, when it is determined that the received specified user identification code does not match the specified user identification code stored in the memory.

2. The theft prevention apparatus for a leisure vehicle according to claim 1, wherein the pull-out operation restricting actuator is configured to operate to cause the pull-out operation stopper member to be moved from the position where the pull-out operation of the mechanical key is enabled to the position where the pull-out operation of the mechanical key is disabled;

and wherein the controller is configured to control the pull-out operation restricting actuator to disable the pull-out operation of the mechanical key at least during running of an engine of the vehicle.

3. The theft prevention apparatus for a leisure vehicle according to claim 1, wherein the lock device is a cylinder lock;

and wherein the cylinder lock includes a key switch configured to cause a main electric power supply control circuit to be turned on or off according to a rotational operation of the mechanical key, and the pull-out operation of the mechanical key is disabled with the key switch in an ON-position where the main electric power supply control circuit is in an ON-state.

4. The theft prevention apparatus for a leisure vehicle according to claim 1, wherein the lock device is a cylinder lock;

wherein the cylinder lock includes a key switch configured to cause a main electric power supply control circuit to be turned on or off according to a rotational operation of the mechanical key;

wherein the pull-out operation restricting actuator is configured to serve as a rotational operation restricting actuator for actuating a rotational operation stopper member for restricting the rotational operation of the mechanical key inserted into the cylinder lock;

and wherein the controller is configured to control the rotational operation restricting actuator to allow the mechanical key to be rotated to an ON-position where the main electric power supply control circuit is in an ON-state, after receiving from the portable device the specified user identification code that matches the user identification code stored in the memory with the key switch in an OFF-position where the main electric power supply control circuit is in an OFF-state.

5. The theft prevention apparatus for a leisure vehicle according to claim 1, wherein the lock device is a cylinder lock;

wherein the cylinder lock includes a key switch configured to cause a main electric power supply control circuit to be turned on or off according to a rotational operation of the mechanical key;

and wherein the controller is configured to control the pull-out operation restricting actuator to enable the pull-out operation of the mechanical key, after receiving from the portable device the specified user identification code that matches the user identification code stored in the memory with the key switch in an OFF-position where the main electric power supply control circuit is in an OFF-state.

6. The theft prevention apparatus for a leisure vehicle according to claim 1, further comprising:

a transponder key configured to transmit a user identification code identical to the specified user identification code of the portable device;

wherein the receiver of the controller is configured to receive the user identification code transmitted from the transponder key.

7. The theft prevention apparatus for a leisure vehicle according to claim 6, wherein the transponder key has a teeth portion substantially conforming in shape to a teeth portion of the mechanical key;

and wherein the transponder key is configured to be insertable into the key hole of the lock device to enable the protruded operation and the retracted operation of the lock bar.

8. The theft prevention apparatus for a leisure vehicle according to claim 6, wherein the transponder key is configured to be mountable to the portable device.

9. A theft prevention apparatus for a leisure vehicle comprising:

a portable device configured to transmit a specified user identification code;

a lock device including:

a lock bar configured to lock or unlock a handle of the leisure vehicle by a protruded operation or a retracted operation thereof;

a mechanical key configured to cause the protruded operation and the retracted operation of the lock bar; and a key hole into which the mechanical key is inserted;

a lock operation stopper member configured to enable or disable the protruded operation and the retracted operation of the lock bar caused by the mechanical key;

a pull-out operation restricting mechanism configured to enable or disable a pull-out operation to pull out the mechanical key from the key hole;

a lock operation restricting actuator configured to operate to cause the lock operation stopper member to be moved from a position where the protruded operation and the retracted operation of the lock bar caused by the mechanical key are disabled to a position where the protruded operation and the retracted operation of the lock bar are enabled;

a controller including:

a memory configured to store a specified user identification code;

a receiver configured to receive the specified user identification code transmitted from the portable device; and a processing unit configured to determine whether or not the received specified user identification code matches the specified user identification code stored in the memory, and to control the lock operation restricting actuator to cause the lock operation stopper member to be moved from the position where the protruded operation and the retracted operation of the lock bar are disabled to the position where the protruded operation and the retracted operation of the lock bar are enabled, when it is determined that the received specified user identification code matches the specified user identification code stored in the memory, and to control the lock operation restricting actuator to cause the lock operation stopper member to be moved to the position where the protruded operation and the retracted operation of the lock bar are disabled and to control the pull-out operation restricting mechanism to cause the lock operation stopper member to be moved to the position where the pull-out operation of the mechanical key is disabled, when it is determined that the received specified user identification code does not match the specified user identification code stored in the memory.

10. The theft prevention apparatus for a vehicle according to claim 9, further comprising:

a rotational operation stopper member configured to restrict the rotational operation of the mechanical key to a lock position and from the lock position to an unlock position, which serves as the lock operation stopper member;

wherein the lock device is a cylinder lock configured to allow the lock bar to be protruded by rotation of the mechanical key to a lock position and to allow the mechanical key to be pulled out from the key hole by rotation of the mechanical key to a pull-out position; and wherein the lock operation restricting actuator is configured to cause the rotational operation stopper member to move to a restriction position where the rotational operation of the mechanical key is restricted.

11. The theft prevention apparatus for a vehicle according to claim 10, wherein the rotational operation stopper member is configured to be able to restrict the rotational operation of the mechanical key to the pull-out position.

12. A theft prevention apparatus for a leisure vehicle comprising:

a portable device configured to transmit a specified user identification code;

a lock device including:

a mechanical key configured to be operated to selectively turn ON or turn OFF a main electric power supply control circuit; and a key hole into which the mechanical key is inserted;

a pull-out operation stopper member configured to enable or disable a pull-out operation to pull out the mechanical key from the key hole;

a pull-out operation restricting actuator configured to operate to cause the pull-out operation stopper member to be moved from a position where the pull-out operation of the mechanical key is disabled to a position where the pull-out operation of the mechanical key is enabled; and a controller including:

a memory configured to store a user identification code;

a receiver configured to receive the user identification code transmitted from the portable device; and a processing unit configured to determine whether or not the received user identification code matches the user identification code stored in the memory, to control the pull-out operation restricting actuator to cause the pull-out operation stopper member to be moved to the position where the pull-out operation of the mechanical key is enabled when it is determined that the received user identification code matches the user identification code stored in the memory, and to control the pull-out operation restricting actuator to cause the pull-out operation stopper member to be moved to the position where the pull-out operation of the mechanical key is disabled when it is determined that the received user identification code does not match the user identification code stored in the memory.

13. The theft prevention apparatus for a leisure vehicle according to claim 12, wherein the mechanical key and key hole form a key switch configured to selectively turn ON or turn OFF the main electric power supply circuit;

wherein the controller is configured to determine whether or not the user identification code received in the receiver matches the user identification code stored in the memory, to enable the mechanical key to turn ON the main electric power supply circuit when it is determined that the received user identification code matches the user identification code stored in the memory, and to disable the mechanical key to turn ON the main electric power supply circuit when it is determined that the received user identification code does not match the user identification code stored in the memory.

14. The theft prevention apparatus for a leisure vehicle according to claim 12, wherein the mechanical key is insertable into at least one of a key hole provided in a cap of a fuel tank, a key hole provided in a helmet holder and a key hole provided in an article container to lock and unlock at least one of the cap of the fuel tank, the helmet holder, and the article container.

* * * * *